United States Patent [19]

Knoll

[11] Patent Number: 5,066,351

[45] Date of Patent: Nov. 19, 1991

[54] HOT/COLD PRESS FORMING METHODS FOR SHAPING THERMOFORMABLE MATERIALS

[75] Inventor: Frederick L. Knoll, Kent, Wash.

[73] Assignee: The Boeing Company, Seattle, Wash.

[21] Appl. No.: 531,998

[22] Filed: May 31, 1990

Related U.S. Application Data

[60] Division of Ser. No. 233,639, Aug. 18, 1988, Pat. No. 4,948,355, which is a continuation-in-part of Ser. No. 52,622, May 20, 1987, Pat. No. 4,789,328.

[51] Int. Cl.$^5$ ............... B29C 31/08; B29C 31/10; B29C 51/20; B29C 51/42
[52] U.S. Cl. ............... 156/212; 72/342.7; 156/222; 156/228; 156/311; 156/475; 264/259; 264/237; 264/316; 264/320; 264/322; 425/384; 425/397; 425/400; 425/508; 425/509
[58] Field of Search ........... 264/316, 320, 322, 348, 264/237, 278, 259, 505; 425/411, 384, 407, 397, 400, 508, 509; 72/342.7, 342.8, 342.92; 156/212, 311, 222, 228, 475

[56] References Cited

U.S. PATENT DOCUMENTS

| | | | |
|---|---|---|---|
| 2,305,433 | 12/1942 | Kyle | 264/348 |
| 2,691,798 | 10/1954 | Winchester et al. | 425/384 |
| 3,026,566 | 3/1962 | Martelli et al. | 18/19 |
| 3,183,291 | 5/1965 | Miller et al. | 264/294 |
| 3,256,564 | 6/1966 | Welshon | 425/384 |
| 3,533,352 | 10/1970 | Miller | 100/93 |
| 3,562,859 | 2/1971 | McIntyre | 425/384 |
| 3,844,701 | 10/1974 | Rockwell | 425/348 |
| 3,917,770 | 11/1975 | Jackson | 254/322 |
| 3,939,024 | 2/1976 | Hoggatt | 156/242 |
| 3,993,787 | 11/1976 | Nakabayashi et al. | 425/348 |
| 4,043,729 | 8/1977 | Paracchi | 425/384 |
| 4,060,364 | 11/1977 | Gras | 425/384 |
| 4,190,408 | 2/1980 | Bronkema et al. | 425/145 |
| 4,239,727 | 12/1980 | Myers et al. | 425/384 |
| 4,284,396 | 8/1981 | Thissen et al. | 425/342.1 |
| 4,304,751 | 12/1981 | Li et al. | 264/325 |
| 4,390,489 | 6/1983 | Segal | 264/126 |
| 4,490,321 | 12/1984 | Klinkau | 264/109 |
| 4,532,093 | 7/1985 | O'Malley et al. | 264/40.1 |
| 4,608,220 | 8/1986 | Caldwell et al. | 264/316 |
| 4,612,081 | 9/1986 | Kasper et al. | 156/583.1 |
| 4,613,393 | 9/1986 | Cattanach et al. | 156/323 |
| 4,657,717 | 4/1987 | Cattanach et al. | 264/10.2 |
| 4,715,923 | 12/1987 | Knoll | 156/380.9 |
| 4,744,904 | 7/1988 | Brick | 361/117 |
| 4,752,204 | 6/1988 | Kataoka | 425/384 |
| 4,755,904 | 7/1988 | Brick | 361/117 |
| 4,758,394 | 7/1988 | Yaita et al. | 264/51 |

FOREIGN PATENT DOCUMENTS 60-008203 3/1985 Japan .................. 264/316

OTHER PUBLICATIONS

Shepard Sikes, Machine Design, May 22, 1986, pp. 68–71.

(List continued on next page.)

Primary Examiner—Jan H. Silbaugh
Assistant Examiner—Catherine Timm
Attorney, Agent, or Firm—Paul C. Cullom, Jr.; Bernard A. Donahue

[57] ABSTRACT

One method of forming a workpiece made of thermoformable material includes the steps of: (a) supporting a raw workpiece on a suspension tray; (b) moving a pair of relatively hot forming dies into position above the workpiece; (c) closing the hot forming dies against the workpiece to heat the workpiece and to form and shape the workpiece into the desired configuration; (d) opening the hot forming dies and removing the hot forming dies away from the workpiece; (e) moving a pair of relatively cold forming dies into position above and below the workpiece; (f) closing the cold forming dies against the workpiece to cool the workpiece while maintaining the workpiece in the desired configuration; and, (g) opening the cold forming dies and removing the finished workpiece form the suspension tray. Other methods are also disclosed.

55 Claims, 10 Drawing Sheets

OTHER PUBLICATIONS

Joseph P. Reardon, Advanced Composites, Mar./Apr. 1987, pp. 98–99.

ICI Fiberite, APC—2 Peek/Carbon Fibre Composite, Data Sheet 1: Product forms of aromatic composite, APC—2, 1986.

ICI Fiberite, APC—2 Peek/Carbon Fibre Composite, Data Sheet 2: Making consolidated sheet from aromatic polymer composite, APC—2, 1986.

ICI Fiberite, APC—2 Peek/Carbon Fibre Composite, Data Sheet 5: Fabricating with aromatic polymer composite, APC—2, 1986.

D180—29584—1 (Boeing) Technical Proposal: "Manufacturing Science of Complex Shape Thermoplastics" (Jun. 1986), portions of pp. 4-57 and 4-58.

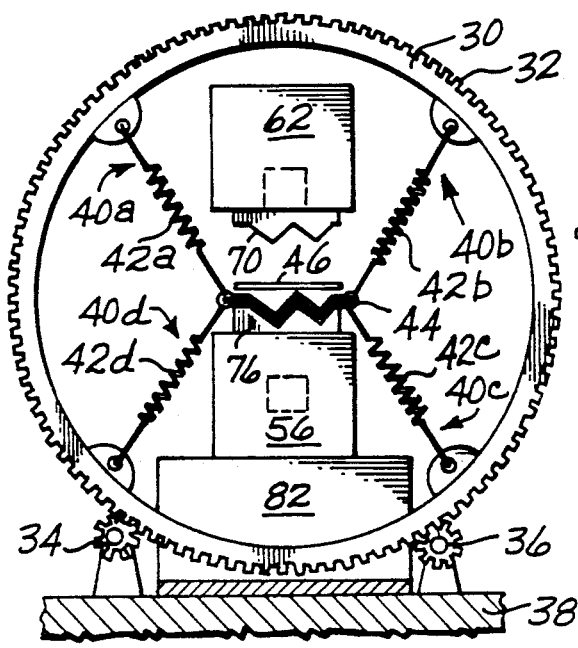
Fig. 3
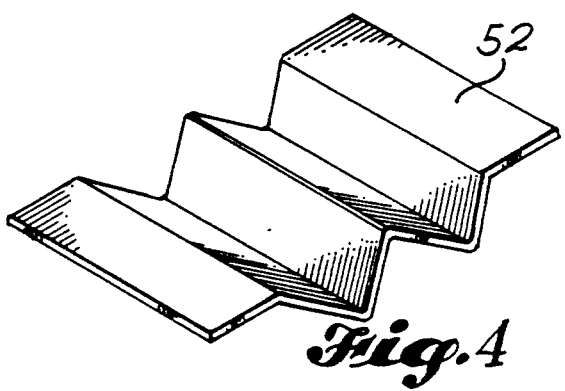
Fig. 4
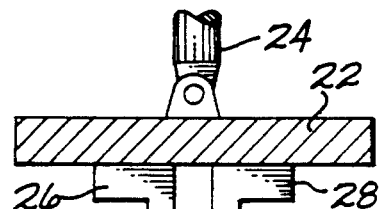
Fig. 5
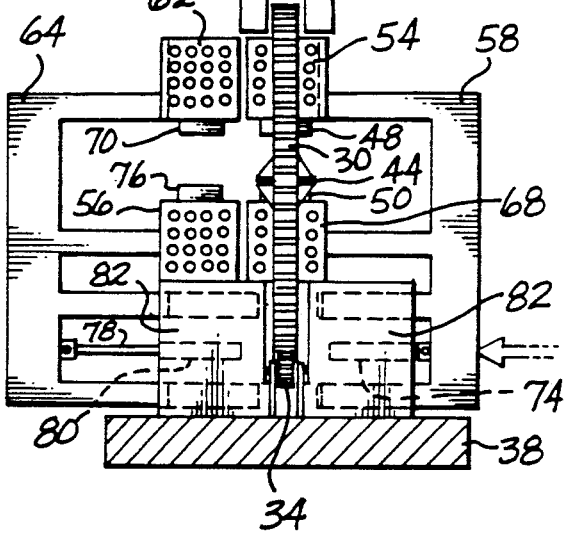
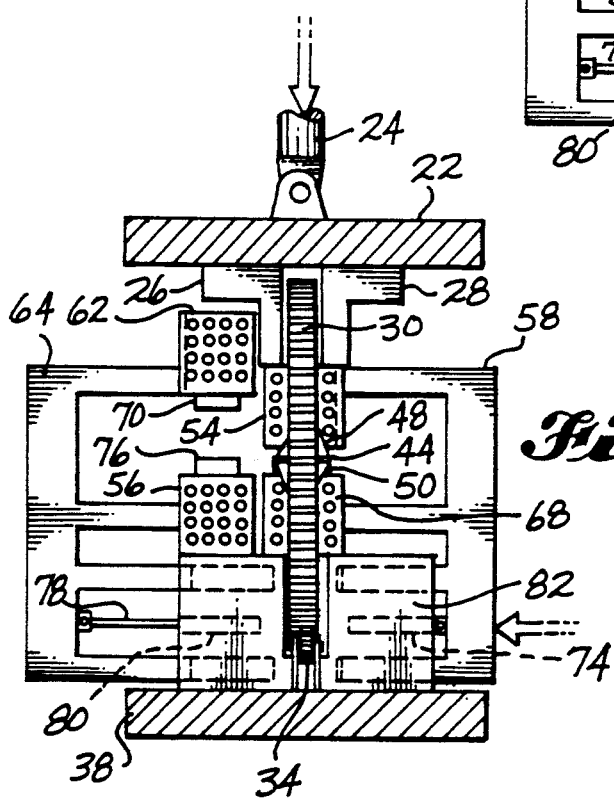
Fig. 6

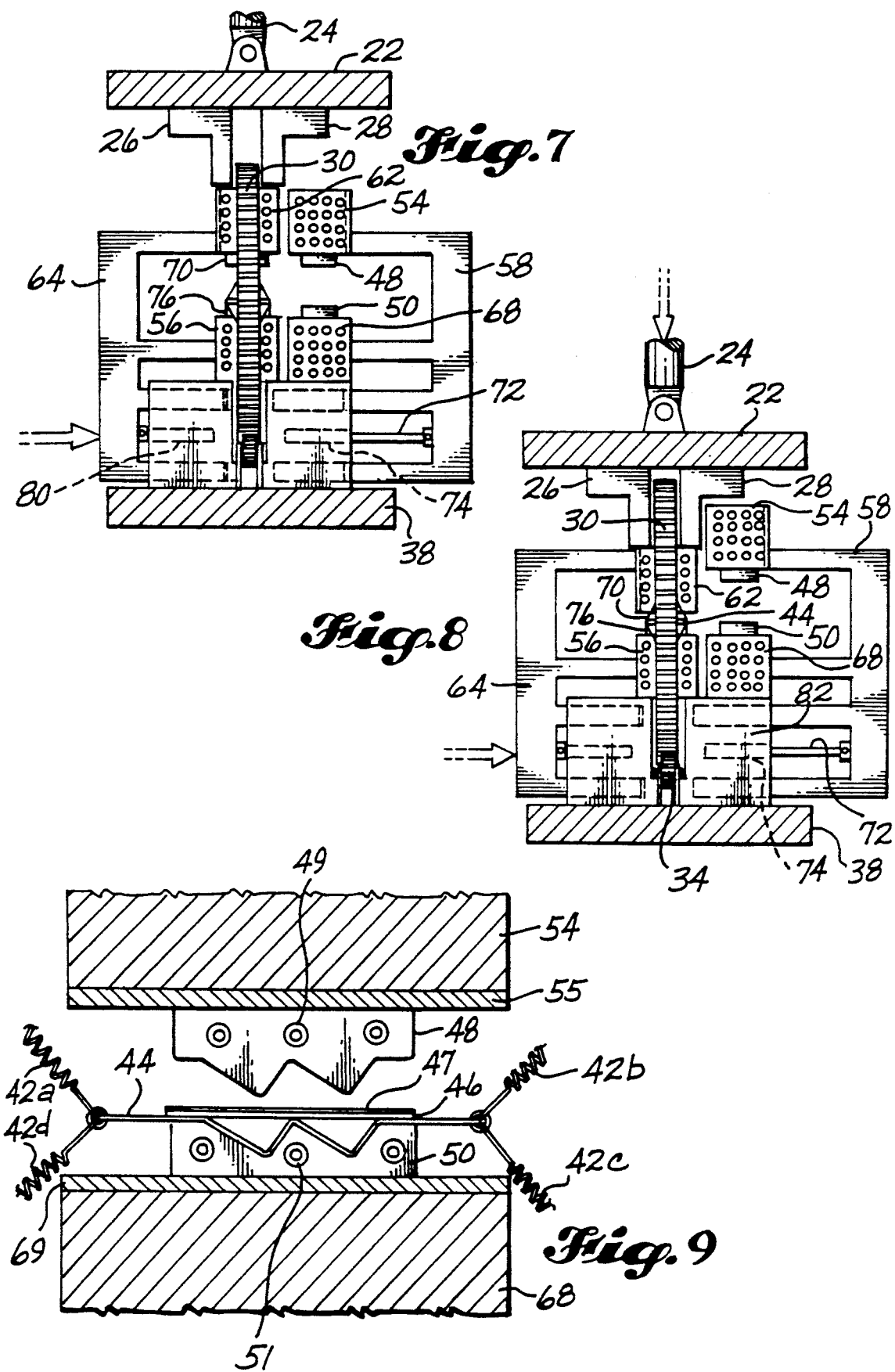

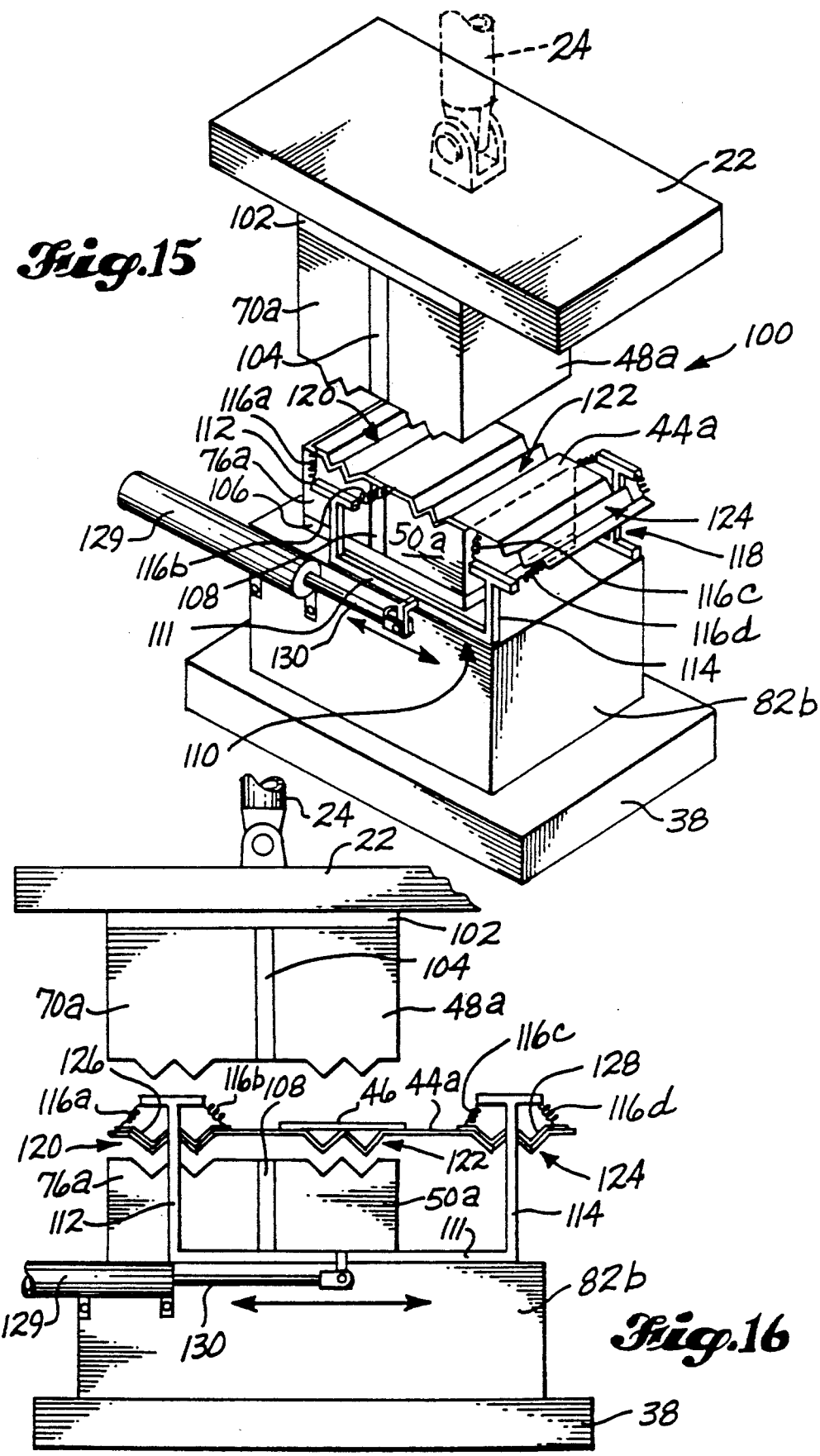

HOT/COLD PRESS FORMING METHODS FOR SHAPING THERMOFORMABLE MATERIALS

CROSS-REFERENCE TO RELATED APPLICATIONS

This application is a divisional of copending application Ser. No. 07/233,639, filed Aug 18, 1988 entitled "Hot/Cold Press Forming Methods and Apparatus for Thermoformable Materials" now U.S. Pat. No. 4,948,355m granted Aug. 14, 1990. Application Ser. No. 07/233,639 is a continuation-in-part of application Ser. No. 07/052,622, filed May 20, 1987 entitled "Hot/Cold Press Forming Methods and Apparatus for Thermoformable Plastic Materials", now U.S. Pat. No. 4,789,328, granted Dec. 6, 1988. Application Ser. No. 07/052,622 is incorporated herein by reference.

BACKGROUND OF THE INVENTION

1) Field of the Invention

My invention is in the field of apparatus and methods for forming and shaping a workpiece made of thermoformable material. The broad term "thermoformable material" is defined to include any material that becomes formable when heat and pressure are applied. For example, apparatus and methods for forming and shaping a workpiece made of thermoformable metal materials, such as superplastically-formable alloys, titanium, and titanium alloys, are within the field of my invention. Further examples are apparatus and methods for forming and shaping a workpiece made of materials which contain thermoplastic resins and thermosetting resins. Thermoplastic resins are defined as materials which have the property of softening or fusing when heated and of hardening and becoming rigid again when cooled. Thermosetting resins are defined as materials which have the property of becoming permanently hard and rigid when heated to a critical temperature.

One important type of thermoplastic material is thermoplastic composite material. Thermoplastic composite materials are combinations of a thermoplastic resin and another material differing in composition or form. The constituents retain their physical identities in the composite material, that is, they do not dissolve or otherwise merge completely into each other although they act together. Advanced composite materials are composite materials made by embedding high-strength, high-modulus fibers within an essentially homogeneous matrix. In one particular example, the invention relates to an apparatus and method for forming and shaping aerospace parts made of advanced thermoplastic composite materials. Advanced thermoplastic composites are now being employed as lightweight structural materials in many aerospace uses.

2) Description of the Related Art

Currently, press forming or shaping of structural components made of advanced thermoplastic composite materials for aerospace use is generally accomplished by heating a pre-consolidated sheet or blank of material in an oven to 750°-800° F. and then transferring it by hand to a press as fast as possible where it is formed between dies before it cools. This process is difficult, cumbersome, and time-consuming. In many cases, the blank of material will cool below the melting temperature and begin solidification before the dies can be closed. Forming the component in this way will result in damage to the material. Manual handling of the material blanks at elevated temperatures (750°-800°0 F.) requires thick heat-resistant gloves and this makes accurate positioning of the blank in relation to the dies very difficult.

There is also a process for consolidating flat sheets of advanced thermoplastic composites that is known in the art. The process involves stacking thin layers of flat blanks of thermoplastic composite material. The stack of flat sheets is heated by being placed in a press with hot platens. The hot material is then transferred by hand to another press with cold platens where the material is pressed flat and held under pressure until cooled. Here again the problem is that the material cools rapidly while being moved between presses and, if used to form shaped components, accurately positioning the hot blanks relative to the dies by hand would be difficult.

SUMMARY OF THE INVENTION

One method of the present invention begins by supporting a raw workpiece on a suspension tray. Then a pair of relatively hot forming units is moved into position above the workpiece and below the suspension tray. Next the relatively hot forming units are closed against the workpiece and the suspension tray to heat the workpiece and to form and shape the workpiece into the desired configuration. In one embodiment, a positioning wheel is used to rotate the workpiece in relation to the forming units while working the workpiece into its final configuration. Then the relatively hot forming units are opened and moved away from the workpiece and the suspension tray. Next a pair of relatively cold forming units is moved into position above the workpiece and below the suspension tray. Then the relatively cold forming units are closed against the workpiece and the suspension tray to cool the workpiece while maintaining the workpiece in the desired configuration. Finally, the relatively cold forming units are opened and the finished workpiece is removed from the suspension tray.

One apparatus of the present invention includes: (a) a base member; (b) a positioning frame supported by the base member; (c) a suspension tray for supporting a raw workpiece, the suspension tray being supported by the positioning frame; (d) a first pair of forming units supported by the base member; (e) a press platen; (f) a second pair of forming units moved by the press platen; (g) an actuator for moving the suspension tray whereby the suspension tray may be moved to a first position and to a second position between the pairs of forming units; and (h) a cylinder for moving the press platen whereby the first pair of forming units and the second pair of forming units may be closed against the raw workpiece and the suspension tray.

Platen and consequent forming unit alignment may be accomplished by using conventional press tie rods which structurally tie together the press headframe and the base platen. However, conventional tie rods are not considered essential because forming unit alignment may be accomplished in a variety of ways. Moreover, a variety of press designs can employ the foregoing inventive combination of a pair of relatively hot forming units and a pair of relatively cold forming units in a single press apparatus.

The present invention solves the previously existing problems in the following way. By placing the raw workpiece material on a suspension tray, the workpiece can be positioned on a low temperature member that can be rotated mechanically in relation to the forming units. If needed, a cover sheet or film may be placed on top of the workpiece to prevent sticking to the upper hot forming unit. The motion of the suspension tray relative to the relatively hot forming units can be sequenced and programmed to form one area before another area, similar to hand working. In other cases, pre-plied stack ups can be formed and consolidated in finished parts saving the expense of putting the material into pre-consolidated sheet form. Heat is transferred into the raw workpiece by radiation and/or convection by a slow clamping motion. This method enables the press operator to do all of the handling of the material when it is at a low temperature and solidified, thereby eliminating the problems of handling a hot limber material when working thermoplastics. The forming units can be moved in and out rapidly without the workpiece being thrown off or out of position because the workpiece stays on the suspension tray in the center of the press. By using both a relatively hot pair and a relatively cold pair of forming units, the process of heating, forming, and cooling the work material can be speeded up significantly especially when the workpiece is an advanced thermoplastic composite material which has to be heated to the relatively high temperature of approximately 750° F. Heating a pair of forming units to this temperature and then cooling the same pair of forming units again to room temperature could take several hours. Using separate pairs of forming units for heating and cooling enables the heating and cooling process to be accomplished in a matter of minutes.

Another advantage of the present invention is that high cost die finishing is not always required because the suspension tray and the cover sheet (if used) contact the workpiece and in doing so impart their finish on the workpiece. In this manner, a variety of textures and finishes can be molded by changing the cover sheet and suspension tray finish rather than the die.

BRIEF DESCRIPTION OF THE DRAWINGS

FIG. 3 is a partial vertical sectional view taken along line 3—3 in FIG. 2 showing the positioning wheel and the suspension tray with the suspension tray supporting a raw workpiece. The press platen and the pressure transfer blocks have been omitted for clarity.

FIG. 4 is an isometric view of a finished thermoformable plastic workpiece having a Z-shape.

FIG. 5 is a front elevational view of the inventive apparatus of FIG. 1 showing the right hand pair of dies (the relatively hot dies) in position above the workpiece and below the suspension tray before press closing.

FIG. 6 is a front elevational view of the inventive apparatus of FIG. 1 showing the press platen down and the relatively hot dies in the closed position on the workpiece and the suspension tray.

FIG. 7 is a front elevational view of the inventive apparatus of FIG. 1 showing the left hand pair of dies (the relatively cold dies) in position above the workpiece and below the suspension tray before press closing.

FIG. 8 is a front elevational view of the inventive apparatus of FIG. 1 showing the press platen down and the relatively cold dies in the closed position on the workpiece and the suspension tray.

FIG. 9 is a side elevational view of the apparatus of FIG. 5 showing the raw workpiece supported on the suspension tray between the relatively hot dies with a cover sheet on top of the workpiece to prevent sticking to the upper die. The relatively hot dies are in the open position before press closing. The die mounts are shown in vertical section.

FIG. 15 is an isometric view of a third embodiment of a hot/cold press forming apparatus constructed according to the principles of the present invention. The actuating rod for the press platen is shown in phantom.

FIG. 16 is a front elevational view of the apparatus of FIG. 15 and shows the positioning frame and suspension arms supporting the suspension tray at a level that gives it clearance for movement above the lower dies.

DESCRIPTION OF THE PREFERRED EMBODIMENTS

Figure 1:
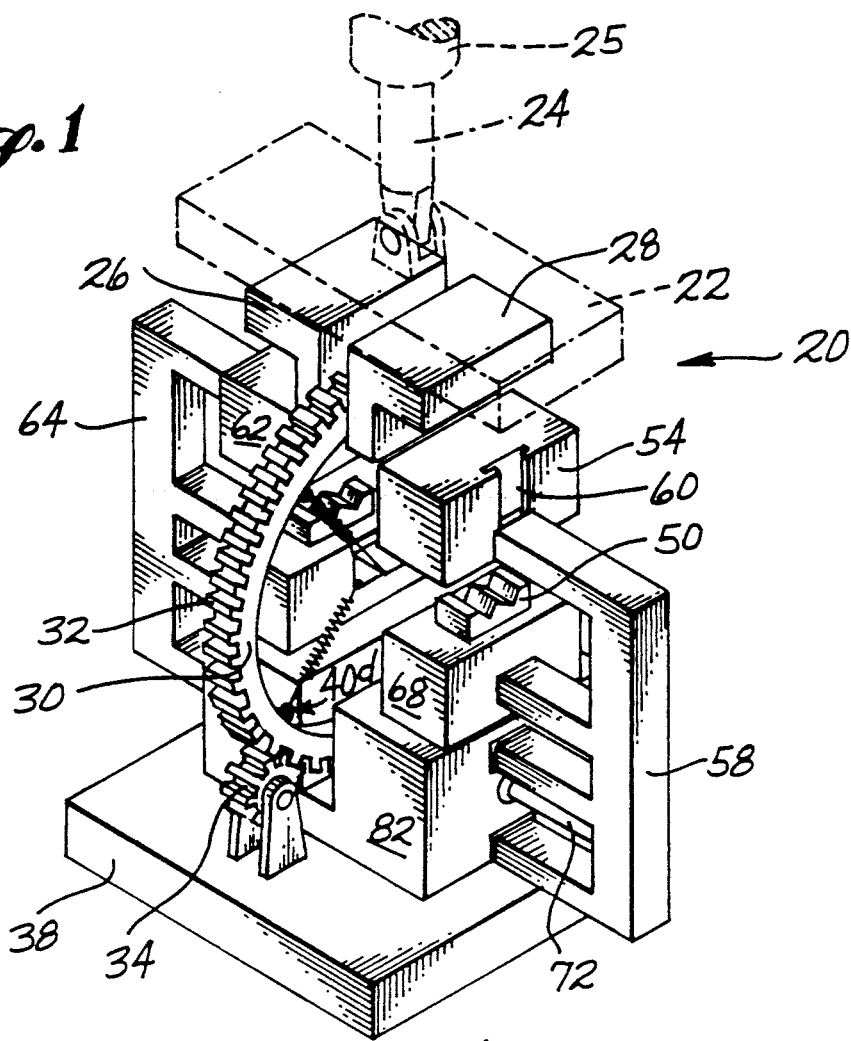
FIG. 1 is an isometric view of a first embodiment of a hot/cold press forming apparatus constructed according to the principles of the present invention. The press platen and its actuating cylinder and rod are shown in phantom. Conventional press tie rods, which may be employed, are not shown in these drawings.
Figure 2:
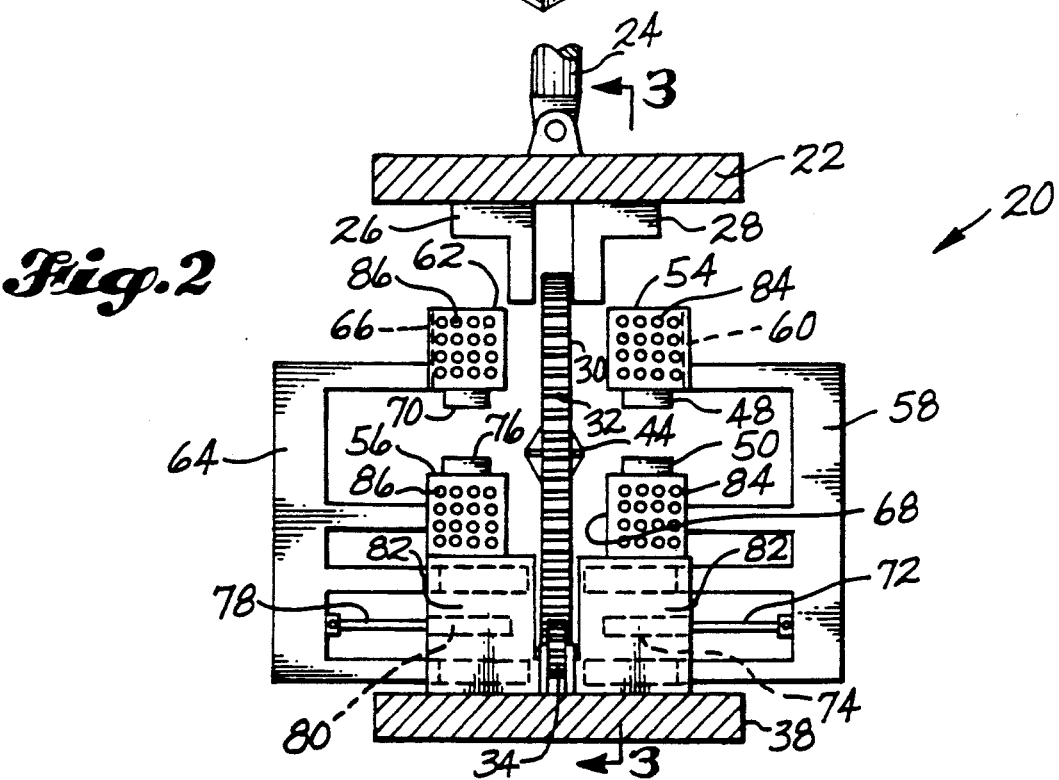
FIG. 2 is a front elevational view of the inventive apparatus of FIG. 1 showing the apparatus in the material load/unload position.

Referring to the drawings, FIGS. 1 and 2 show the first embodiment of a hot/cold press forming apparatus 20 constructed according to the principles of the invention. The terms "hot" and "cold" are used in a relative sense to mean that there exists a temperature differential between the two pairs of forming units. Apparatus 20 includes a press platen 22 which is vertically actuated by a rod 24. Rod 24 is driven by a conventional double-acting cylinder 25 of either the hydraulic or pneumatic type. Cylinder 25 is mounted on a headframe (not shown) or a non-moving structure above press platen 22. Other conventional press activating mechanisms may be employed in lieu of the cylinder.

Platen 22 has mounted on its lower face two pressure transfer blocks 26 and 28 in a spaced-apart relationship. Pressure transfer blocks 26 and 28 are shown as separate members in the drawings, but they may be constructed in a variety of other ways such as integral parts of platen 22. In the center portion of apparatus 20 is a positioning wheel 30, the upper portion of which is located between pressure transfer blocks 26 and 28. As shown in FIG. 3, positioning wheel 30 is circular in shape and its outer periphery carries teeth 32. Teeth 32 engage gears 34 and 36 which support positioning wheel 30. Gears 34 and 36 are mounted on base platen 38.

Base platen 38 may be omitted from the construction of apparatus 20, in which event base member 82 may rest directly on the factory floor and be aligned by other means. Gears 34 and 36 may also be mounted on the factory floor or be mounted on arms extending out from base member 82. Gear 36 is powered by a reversible motor (not shown), so that positioning wheel 30 can be rotated in either direction by programmable controls or the press operator.

Figure 11:
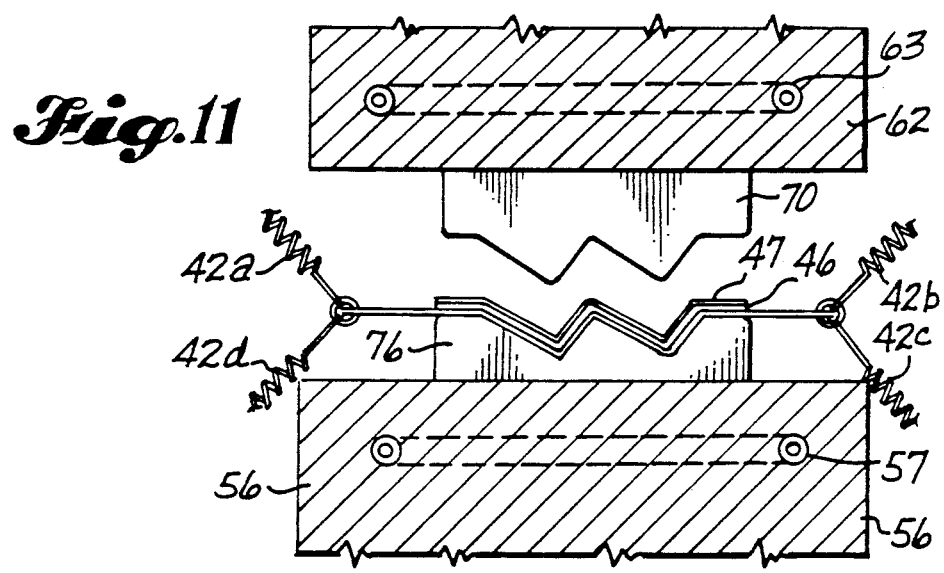
FIG. 11 is a side elevational view of the apparatus of FIG. 7 showing the workpiece supported on the suspension tray between the relatively cold dies. The relatively cold dies are in the open position. The die mounts are shown in vertical section.

Positioning wheel 30 has four adjustable suspension arms 40a, 40b, 40c, and 40d mounted inside the wheel. The arms include a section constructed of springs 42a, 42b, 42c, and 42d or of an elastic material. The four suspension arms each have Y-shaped harnesses which are attached to and support a suspension tray 44 located at the center of the wheel 30. As shown in FIGS. 9 and 11, suspension tray 44 is supported at a level that gives minimum clearance above the lower dies 50 and 76.

As shown in FIGS. 3 and 9, suspension tray 44 supports raw workpiece 46 which is to be formed and shaped by the press. A cover sheet or film 47 (FIG. 9) may optionally be used on top of and/or below workpiece 46. Suspension tray 44 is a preformed member, preferably made out of thin sheet metal (such as aluminum alloy or stainless steel), and having a shape which is similar to the forming dies. The term "tray" when used herein is to be understood as a thin sheet made in a shape generally conforming to the die pairs. For example, suspension tray 44, upper hot die 48, and lower hot die 50 may all have a Z-shape in side view as shown in FIG. 9. This is the shape of the finished workpiece 52 as shown in FIG. 4. It is to be understood that the Z-shape is shown by way of example only and that a variety of other shapes may be used in practicing the invention. Suspension tray 44 is shown as a solid member in the drawings but it may be modified to provide for the application of a vacuum through the suspension tray to hold the workpiece in place.

As shown in FIG. 9, upper hot die mount 54 and lower hot die mount 68 have external insulation boards 55 and 69 to insulate the die mounts from the upper hot die 48 and the lower hot die 50, respectively. Upper hot die 48 and lower hot die 50 are heated by heating elements 49 and 51, respectively. Dies 48 and 50 each have conventional temperature gauge and control capabilities such as internal thermocouples (not shown). Upper die mount 54 is attached to the right support arm 58 by means of a sliding track 60 as shown in FIG. 1 which has either a spring-driven or a cylinder-driven return so that when platen 22 and pressure transfer blocks 26 and 28 are retracted then upper die mount 54 will return to its elevated or open position. The small holes 84 in the side walls of die mounts 54 and 68 are to lighten the weight of the die mounts and to cool them.

Right support arm 58 supports upper hot die mount 54 and is attached to lower hot die mount 68, whereby both move horizontally left and right with support arm 58. Lower hot die mount 68 slides horizontally on top of base member 82. A guide or track (not shown) may be used for reduced friction and better alignment. Lower die mount 68 does not move vertically, whereas upper die mount 54 moves up and down in response to platen 22 and pressure transfer blocks 26 and 28 when right support arm 58 is in the retracted or pressing position (FIGS. 5 and 6). Right support arm 58 is moved horizontally by rod 72 which is driven by a double-acting cylinder 74 of either the hydraulic or pneumatic type mounted in the right side of base 82 which also supports right support arm 58.

As shown in FIG. 11, upper cold die mount 62 and lower cold die mount 56 have internal cooling elements 63 and 57 for cooling the upper cold die 70 and the lower cold die 76, respectively. Dies 70 and 76 each have conventional temperature gauge and control capabilities such as internal thermocouples (not shown). Upper cold die mount 62 is attached to the left support arm 64 by means of a sliding track 66 (shown in phantom in FIG. 2) which has either a spring-driven or a cylinder-driven return so that when platen 22 and pressure transfer blocks 26 and 28 are retracted then upper die mount 62 will return to its elevated or open position. Small holes 86 in the side walls of die mounts 56 and 62 are to lighten the weight of the die mounts and to cool them.

Left support arm 64 supports upper cold die mount 62 and is attached to lower cold die mount 56, whereby both move horizontally left and right with support arm 64. Lower cold die mount 56 slides horizontally on top of base member 82. A guide or track (not shown) may be used for reduced friction and better alignment. Lower die mount 56 does not move vertically, whereas upper cold die mount 62 moves up and down in response to press platen 22 and pressure transfer blocks 26 and 28 when left support arm 64 is in the retracted or pressing position (FIGS. 7 and 8). Left support arm 64 is moved horizontally by rod 78 which is driven by a double-acting cylinder 80 of either the hydraulic or pneumatic type mounted in the left side of base 82 which also supports left support arm 64.

Platen alignment, that is, alignment between press platen 22 and base platen 38, and consequent die alignment may be accomplished by employing conventional press tie rods which structurally tie together the headframe (not shown) or some other non-moving structure above press platen 22 and the base platen 38. However, conventional tie rods are not considered essential because die alignment may be accomplished in other ways. A variety of press designs can employ the foregoing invention combination of a pair of relatively hot dies and a pair of relatively cold dies in a single press apparatus.

Figure 13:
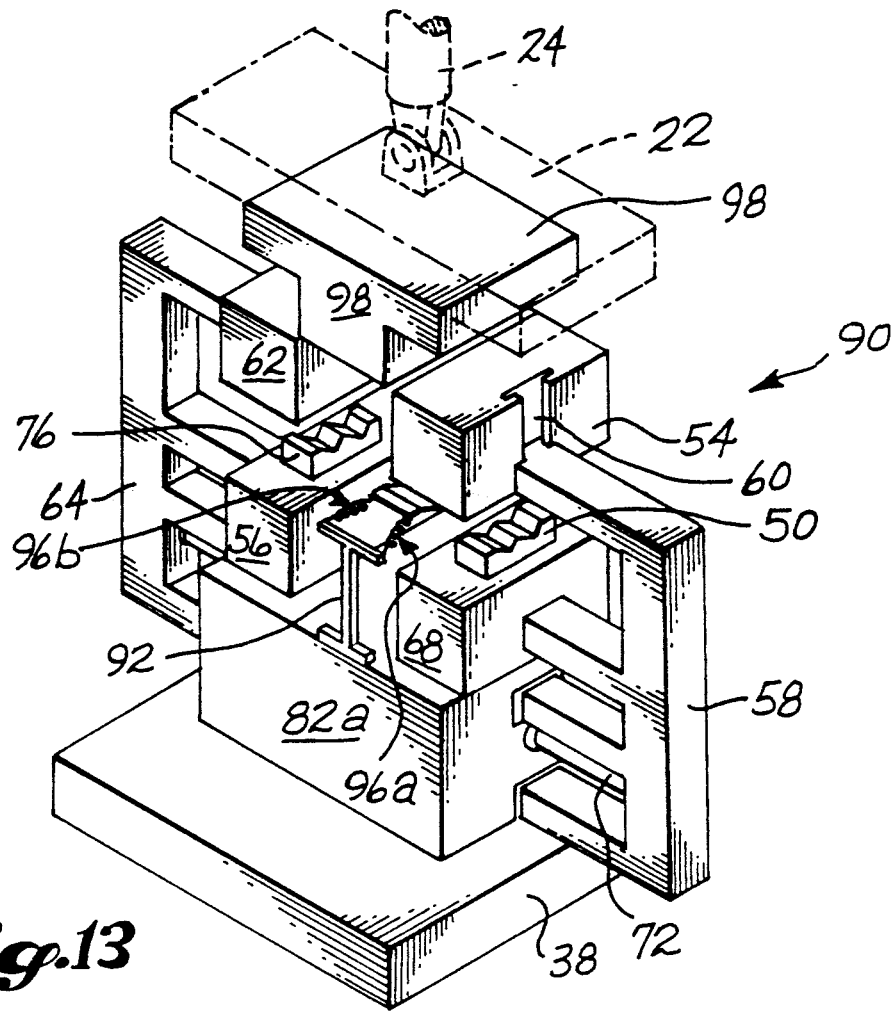
FIG. 13 is an isometric view of a second embodiment of a hot/cold press forming apparatus constructed according to the principles of the present invention. The press platen and its actuating rod are shown in phantom.
Figure 14:
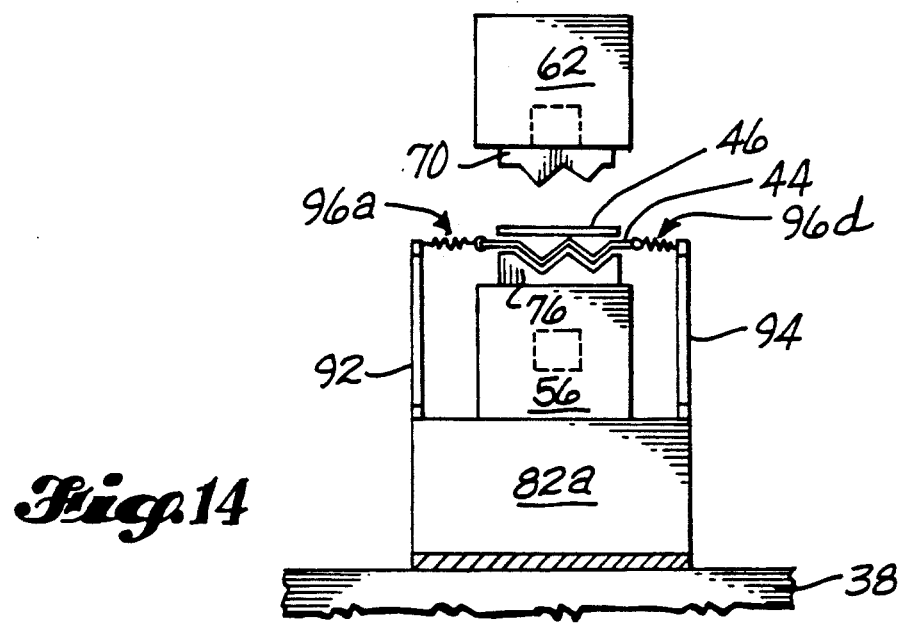
FIG. 14 is a partial vertical sectional view of the apparatus of FIG. 13 and shows the positioning posts and the suspension tray with the suspension tray supporting a raw workpiece. The press platen and the pressure transfer block have been omitted for clarity.

FIGS. 13 and 14 show the second embodiment of a hot/cold press forming apparatus 90 constructed according to the principles of the invention. Apparatus 90 is a simplified version of the apparatus 20 shown in FIGS. 1 and 2. Components of the two embodiments having like design and construction have been given the same reference numerals in the drawings.

The primary difference between the first and second embodiments is that positioning wheel 30 has been replaced by two vertical I-shaped positioning frames 92 and 94 which are mounted on base member 82a. Each of the four adjustable suspension arms 96a, 96b, 96c, and 96d have one end attached to one of the positioning frames 92 or 94 and the other end attached to suspension tray 44 located midway between the positioning frames 92 and 94. Platen 22 has mounted on its lower face a single pressure transfer block 98. Pressure transfer block 98 is shown as a separate member in FIG. 13, but it may be constructed as an integral part of platen 22. Also, in this embodiment, cylinders 74 and 80 may be combined into a single double-acting cylinder with a double-end rod. In other respects, the construction and operation of apparatus 90 is the same as apparatus 20. It is to be understood that base platen 38 may be omitted from the construction of apparatus 90 in which case base member 82 would rest directly on the factory floor.

FIGS. 15 and 16 show the third embodiment of a hot/cold press forming apparatus 100 constructed according to the principles of the invention. Apparatus 100 is designed for forming and shaping larger workpieces made of thermoformable material which necessitate the use of larger and heavier dies in the press apparatus. Hence, in this embodiment, the dies are horizontally stationary and the suspension tray and workpieces are moved horizontally from one pair of dies to the other pair of dies. To prevent uneven loading of the press (which is undesirable), a dummy workpiece moves into position in the unused pair of dies at the same time that the real workpiece moves into position in the used pair of dies.

Apparatus 100 has certain components that are the same as in the first embodiment apparatus 20 shown in FIGS. 1 and 2. Components of the two embodiments having like design and construction have been given the same reference numerals in the drawings.

In FIGS. 15 and 16, upper hot die 48a and upper cold die 70a are mounted on the lower face of platen 22. A layer of insulation 102 separates platen 22 from dies 48a and 70a. Another layer of insulation 104 separates dies 48a and 70a from each other.

Lower hot die 50a and lower cold die 76a are mounted on base member 82b. A layer of insulation 106 separates base member 82b from dies 50a and 76a. Another layer of insulation 108 separates dies 50a and 76a from each other.

Located on the front side of apparatus 100 is a first positioning frame 110 having a horizontal member 111 and two vertical T-shaped positioning posts 112 and 114. Horizontal member 111 slides back and forth on top of base member 82b. Each of the four adjustable suspension arms 116a, 116b, 116c, and 116d have one end attached to one of the vertical positioning posts 112 and 114 and the other end attached to suspension tray 44a. A second positioning frame 118 of like design having a horizontal member and two vertical T-shaped positioning posts is located on the rear side of apparatus 100. Four more adjustable suspension arms of like design have one end attached to one of the vertical positioning posts of positioning frame 118 and the other end attached to suspension tray 44a.

Positioning frame 110 is moved back and forth in a horizontal plane by rod 130 which is connected through a linkage to horizontal member 111. Rod 130 is driven by a conventional double-acting cylinder 129 mounted on the front side of base member 82b. A second cylinder and rod combination of identical design is mounted on the rear side of base member 82b to move positioning frame 118 back and forth in a horizontal plane in tandem with positioning frame 110 so that suspension tray 44a is maintained in correct alignment with the dies. Alternatively, the cylinders can be mounted on the factory floor or some other non-moving structure. The positioning frames could also be designed as one piece tied together with cross members, and in that event, one cylinder could be employed instead two.

Suspension tray 44a has three work stations 120, 122, and 124. As shown in FIG. 16, a real workpiece 46 is placed on the second work station 122 and dummy workpieces 126 and 128 are placed in the first and third work stations 120 and 124, respectively. The dummy workpieces prevent the undesirable situation of uneven loading of the press. When the real workpiece 46 is being pressed by either the pair of hot dies 48a and 50a or the cold dies 70a and 76a, there is a dummy workpiece of equal thickness being pressed by the other pair of dies.

FIG. 16 also shows that when the dies are in the open position suspension tray 44a is held by the suspension arms at a level that gives clearance above the highest portions of lower dies 50a and 76a so that suspension tray 44a can move freely back and forth in a horizontal plane without bumping the lower dies. In other respects, the construction and operation of apparatus 100 is similar to apparatus 20 described earlier.

The method embodiments of the invention will now be described. The processes begin with the press operator heating the hot dies, such as 48 and 50 (FIG. 2) or 48a and 50a (FIG. 15), to the desired temperature. The proper temperature of the hot dies is dependent on the particular thermoformable material that is to be shaped by the apparatus 20 or 90 or 100. For example, when raw workpiece 46 is an advanced thermoplastic composite material, then the temperature needs to be relatively high. Raw workpiece 46 may be made of the commercially-available advanced thermoplastic composite material known as APC-2 sold by Fiberite Corporation. The APC-2 is supplied as a sheet material which is composed of continuous carbon fibers dispersed in a matrix of PEEK (a polyetheretherketone of repeating units). To form and shape a workpiece made of APC-2, the hot dies (48 and 50 or 48a and 50a) should be at about 750° F.

As another example, when raw workpiece 46 is made of the commercially-available thermoplastic composite material known as polyphenylene sulfide or PPS, then the hot dies should be at about 650° F.

As a further example, when raw workpiece 46 is made of the commercially-available thermoplastic composite material known as AZDEL sold by PPG Industries Inc., then the hot dies (48 and 50 or 48a and 50a) should be at about 450° F. The AZDEL is supplied as a sheet material which is composed of continuous glass fibers dispersed in a polypropylene matrix. Other thermoplastic materials include polyetherimide and polyethersulfone.

When raw workpiece 46 is made of metal or metal alloy, then the temperature of the hot dies, such as 48 and 50 or 48a and 50a, should be quite high. For example, when workpiece 46 is made of titanium, then the hot dies should be at about 1400° F.

The next step is for the press operator to coat the upper working surface of suspension tray 44 or 44a with a conventional mold release agent. The workpiece, when molten, will stick to the suspension tray. When the suspension tray cools down, the finished workpiece will be released. The operator coats the suspension tray with mold release agent occasionally during each run. Cover sheet or film 47 (if used) is also coated with mold release agent.

The remaining steps in the method using apparatus 20 or 90 will now be described and following that there will be a description of the remaining steps in the method using apparatus 100. While the apparatus 20 or 90 is in the material loading position (as shown in FIG. 2 for apparatus 20), the operator places the raw workpiece 46 on top of the suspension tray 44 as shown in FIGS. 3 and 9. By using cover sheet 47 over the workpiece 46 and other forming aids (such as a second piece of shaped metal above the workpiece), either preconsolidated sheet material or ply stack ups of thermoplastic composites may be used. Step forming or bump cycles can be used for shaping complex parts or when using materials with outgassing requirements.

For apparatus 20 and 90, the operator then activates cylinder 74 to retract rod 72 as indicated by the arrow in FIG. 5. This moves right support arm 58 horizontally to the left which brings upper hot die mount 54 and lower hot die mount 68 within the plane of positioning wheel 30 as shown in FIG. 5. Upper hot die mount 54 is now positioned below pressure transfer blocks 26 and 28 and above suspension tray 44 supporting raw workpiece 46 (FIGS. 5 and 9). Lower hot die mount 68 is now positioned below suspension tray 44.

Figure 10:
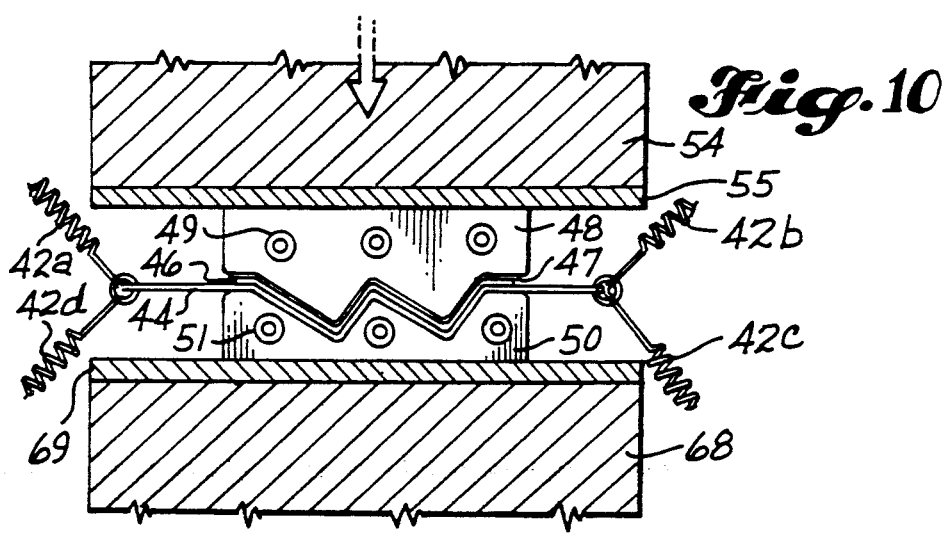
FIG. 10 is a side elevational view of the apparatus of FIG. 6 showing the workpiece supported on the suspension tray at the point in the forming process when the relatively hot dies are in the fully closed position and the workpiece has been formed into the desired shape.

The operator then activates cylinder 25 which pushes rod 24 vertically downward as indicated by the upper arrow in FIG. 6. This downward movement of press platen 22 and pressure transfer blocks 26 and 28 forces down upper hot die mount 60 and upper hot die 48. Heat is transferred to workpiece 46 by radiation and convection from upper hot die 48 and lower hot die 50. Upper hot die 48 is lowered slowly until it touches raw workpiece 46 or cover sheet 47 if used. The operator rotates positioning wheel 30 as needed so that there is maximum contact and heat transfer from upper hot die 48 to the workpiece 46. Suspension tray 44 can move slightly up and down and sideways by virtue of the springs or elastic material in the suspension arms. The slow clamping motion of upper hot die 48 continues until the hot dies 48 and 50 are fully closed as shown in FIGS. 6 and 10. At this point, the workpiece 46 is being compression molded. The amount of pressure applied by the hot dies and the length of time the compression continues are again dependent on the particular thermoformable material being employed. With thermoplastic composites, the hot dies are kept fully closed and under pressure for the time period required to completely form and shape the workpiece into the desired configuration.

The next step is to retract upwardly the press platen 22 and the pressure transfer blocks 26 and 28. Upper hot die mount 54 and upper hot die 48 return to the open position shown in FIG. 5. Then right support arm 58 is moved horizontally to the right by extending rod 72. This moves the hot dies horizontally to the right and out of the plane of Positioning wheel 30 and back to the position shown in FIG. 2.

Next the operator activates cylinder 80 to retract rod 78 as indicated by the arrow in FIG. 7. This moves left support arm 64 horizontally to the right which brings upper cold die mount 62 and lower cold die mount 56 within the plane of positioning wheel 30 as shown in FIG. 7. Upper cold die mount 70 is now positioned below pressure transferred blocks 26 and 28 and above suspension tray 44 supporting workpiece 46 (FIGS. 7 and 11). Lower cold die mount 56 is now positioned below suspension tray 44.

Figure 12:
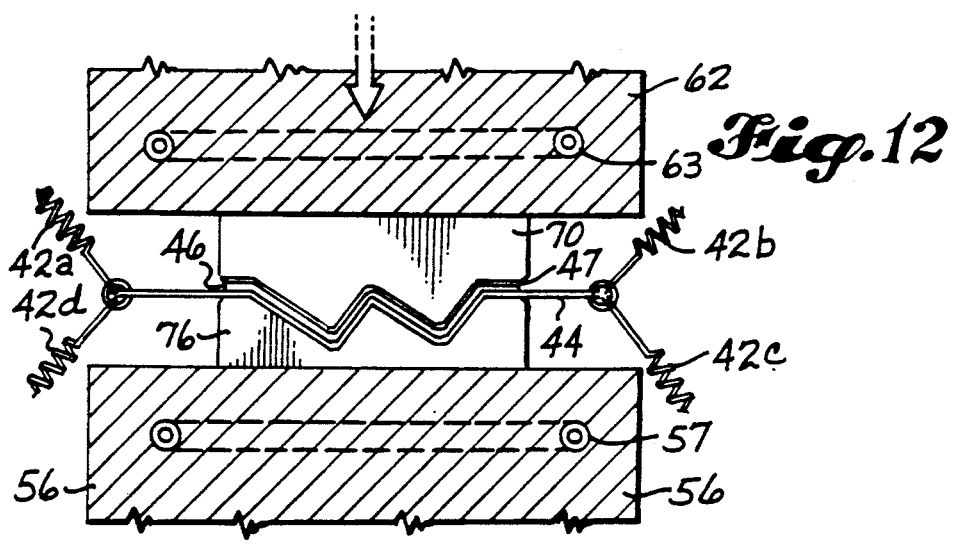
FIG. 12 is a side elevational view of the apparatus of FIG. 8 showing the workpiece supported on the suspension tray between the relatively cold dies which are in the closed position to cool the workpiece.

The operator then activates cylinder 25 which pushes rod 24 vertically downward as indicated by the upper arrow in FIG. 8. This downward movement of press platen 22 and pressure transfer blocks 26 and 28 forces down upper cold die mount 62 and upper cold die 70. Upper cold die 70 continues downwardly until the cold dies 70 and 76 are fully closed as shown in FIGS. 8 and 12. At this point, the workpiece 46 is being compression molded again and simultaneously cooled by the cold dies 70 and 76, which may be at room temperature at the beginning. The amount of pressure applied by the relatively cold dies and the length of time the compression continues are again dependent on the thermoformable material being employed. For example, when the workpiece is made of APC-2 the cold dies are held closed and under pressure for the time required for the APC-2 to cool to below its glass transition temperature which is about 290° F. As a further example, when the workpiece is made of polyphenylene sulfide the cold dies are held closed and under pressure for the time required for the polyphenylene sulfide to cool below its glass transition temperature of about 180° F. Conventional temperature gauge and control capabilities (not shown) are provided to monitor and maintain the temperature of each cold die.

The next step is to retract upwardly the press platen 22 and the pressure transfer blocks 26 and 28. Upper cold die mount 62 and upper cold die 70 return to the open position shown in FIG. 7. Then left support arm 64 is moved horizontally to the left by extending rod 78. This moves the cold dies horizontally to the left and out of the plane of positioning wheel 30 and back to the position shown in FIG. 2. The foregoing processing may also be accomplished automatically by using programmable controls.

The operator then unloads the finished workpiece 52 (FIG. 4) from suspension tray 44. The process is then repeated on another raw workpiece 46 as described above.

The remaining steps in the method of using apparatus 100 will now be described. The operator activates cylinder 25 which pushes rod 24 vertically downward. This downward movement of press platen 22 forces down the upper dies (upper hot die 48a and upper cold 70a). Heat is transferred to workpiece 46 in the second workstation 122 (FIG. 16) by radiation and convection from upper hot die 48a and lower hot die 50a. Upper hot die 48a is lowered slowly until it touches raw workpiece 46 (or cover sheet 47 if used). Suspension tray 44a moves down with the upper dies by virtue of the springs or elastic material in the suspension arms. The slow clamping motion of upper hot die 48a continues until the hot dies 48a and 50a are closed. At this point, the workpiece 46 is being compression molded. The amount of pressure applied by the hot dies and the length of time the compression continues are again dependent on the particular thermoformable material being employed. The hot dies are kept closed and under pressure for the time period required to completely form and shape the workpiece into the desired configuration.

The next step is to retract upwardly the press platen 22. The upper dies return to the open position shown in FIG. 16. Then positioning frames 110 and 118 are moved horizontally to the left by retracting rod 130 into cylinder 129 and likewise for the corresponding cylinder and rod on the rear side. This moves suspension tray 44a horizontally to the left and locates workstation 122 and workpiece 46 between upper cold die 70a and lower cold die 76a.

The operator then activates cylinder 25 which pushes rod 24 vertically downward. This downward movement of press platen 22 forces down upper cold die 70a. Upper cold die 70a continues downwardly until the cold dies 70a and 76a are closed. At this point, the workpiece 46 is again being compression molded and simultaneously cooled by the cold dies 70a and 76a. The amount of pressure applied by the cold dies and the length of time the compression continues are again dependent on the thermoformable material being employed.

The next step is to retract upwardly the press platen 22. The upper dies return to the open position. The operator then unloads the finished workpiece 52 (FIG. 4) from suspension tray 44a. The process is then repeated on another raw workpiece 46 as described above.

A variation of the foregoing processes is usually required when the raw workpiece 46 is made of a thermosetting material. One example of a thermosetting material is the commercially-available thermosetting composite material which contains a polyimide resin known as PMR-15.

The following description is presented to exemplify the process for thermosetting materials, such as PMR-15, when using apparatus 20 or 90. The process is similar when using apparatus 100. A raw workpiece 46 made of PMR-15 composite should be pre-heated in an oven to a temperature of about 100°-150° F. The operator then transfers the workpiece 46 to the suspension tray 44 while the apparatus 20 or 90 is in the material loading position (as shown in FIG. 2 for apparatus 20). In this case, the cooler dies 70 and 76 additionally have heating elements which are used to pre-heat dies 70 and 76 to an intermediate temperature of about 430° F. The cooler dies 70 and 76 are then brought into position above and below the workpiece 46 by moving left support arm 64 horizontally to the right by activating cylinder 80 to retract rod 78 as indicated by the arrow in FIG. 7.

The operator activates cylinder 25 which pushes rod 24 vertically downward. The downward movement of press platen 22 forces cooler die 70 downward until cooler dies 70 and 76 are closed as shown in FIGS. 8 and 12. The workpiece 46 is thus heated to about 430° F. and compression molded by dies 70 and 76. This is an important temperature for PMR-15 composites because it is the temperature at which the solvent (used to carry the resin into the fibers) flashes off. The workpiece is allowed to soak at this temperature until the solvent is gone. The operator then opens the cooler dies 70 and 76 by retracting the press platen 22. The left support arm 64 is moved horizontally to the left by extending rod 78 in order to move cooler dies 70 and 76 to the left and away from the workpiece.

The next step is to subject the workpiece to the hotter dies 48 and 50 which have been pre-heated to a higher temperature of about 560°-580° F. which is the peak cure temperature for PMR-15 composite. The operator moves right support arm 58 to the left by activating cylinder 74 to retract rod 72 in order to position the hotter dies 48 and 50 as indicated in FIG. 5. The hotter dies 48 and 50 are then forced down by lowering press platen 22 until the hotter dies 48 and 50 are fully closed as shown in FIGS. 6 and 10. At this point, the workpiece 46 is being compression molded and cured at about 560°-580° F. The workpiece is held at this temperature for 30 minutes or more for curing.

The next step is to retract the press platen 22 and move right support arm 58 to the right by extending rod 72 in order to move hotter dies 48 and 50 to the right and away from the workpiece. The foregoing processing may also be accomplished automatically by using programmable controls.

The operator then unloads the finished workpiece 52 from suspension tray 44. The process is then repeated on another raw workpiece as described above.

As another example, if the raw workpiece 46 is made of the commercially-available thermoformable plastic material known as TORLON sold by Amoco Chemicals Co., then the cooler dies 70 and 76 should be heated to an intermediate temperature of about 430° F. and the hotter dies 48 and 50 should be heated to a higher temperature of about 700°-750° F. TORLON is a polyamideimide material and it is sometimes considered to be a thermoplastic material, but for purposes of the present invention it is processed in a manner which is similar to the process described above for thermosetting materials.

As a further example, if the raw workpiece 46 is made of the commercially-available thermoformable plastic materials known as the AVIMID K series, such as AVIMID K-III, sold by E. I. du Pont de Nemours and Co., then the cooler dies 70 and 76 should be heated to an intermediate temperature and the hotter dies 48 and 50 should be heated to a higher temperature. The AVIMID K series are polyimide materials and are similar to a thermoplastic material after they have been consolidated, but initially when in the prepreg form they are processed in a manner which is similar to the process described above for thermosetting materials. As an AVIMID K series material is heated first to an intermediate temperature and then to a higher temperature, it undergoes a condensation reaction which completely forms the polymer. The completely formed polymer can then be processed in a manner which is similar to the process described above for thermoplastic materials.

Figure 17:
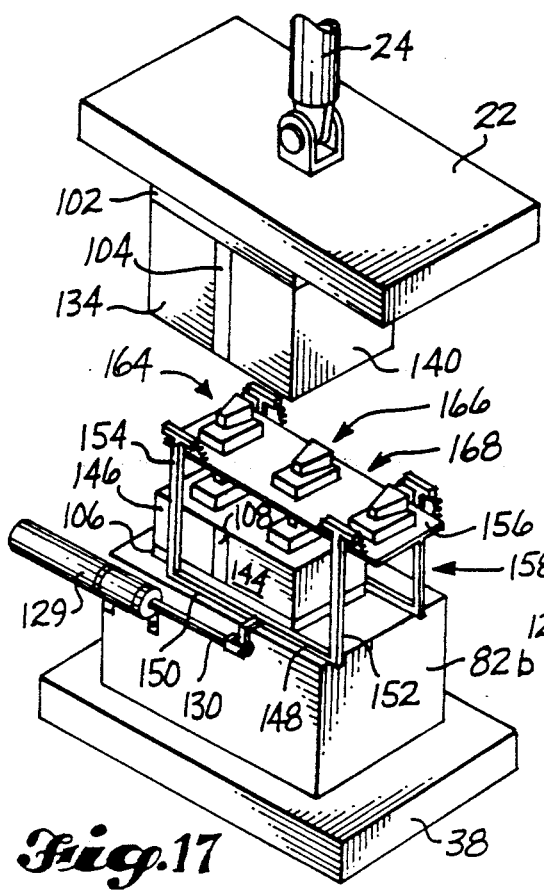
FIG. 17 is an isometric view of another embodiment of a hot/cold press forming apparatus constructed according to the principles of the invention.
Figure 18:
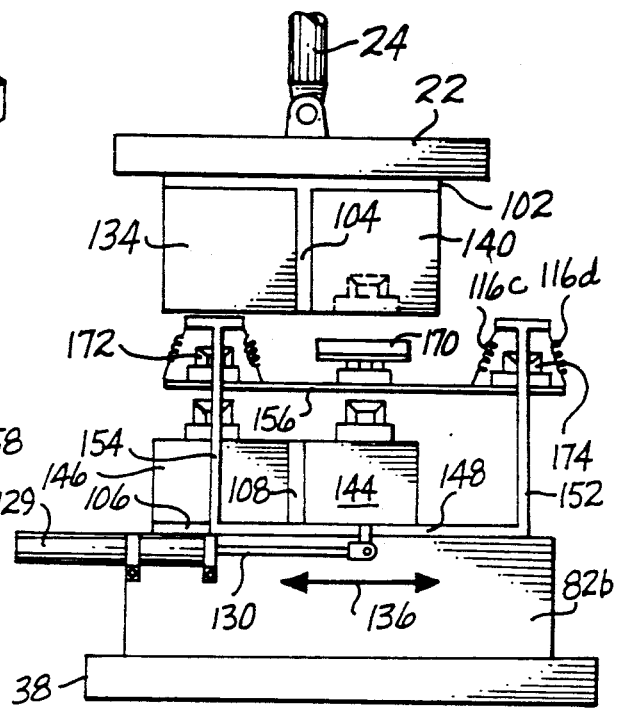
FIG. 18 is a front elevational view of the apparatus of FIG. 17 and shows the positioning frame and support arms supporting the suspension tray at a level that gives it clearance for movement above the lower forming units.

FIGS. 17 and 18 show another embodiment of a hot/cold press forming apparatus 132. Apparatus 132 is a modified version of apparatus 100 (FIGS. 15 and 16) and it has certain components that are the same as in apparatus 100. Components of the two embodiments having like design and construction have been given the same reference numerals in the drawings. In this embodiment, the dies are horizontally stationary and the suspension tray and workpieces are moved horizontally from one pair of dies to the other pair of dies as shown by arrows 136. To prevent uneven loading of the press, it is preferred to have a dummy workpiece move into position in the unused pair of dies at the same time that the real workpiece moves into position in the pair of dies being used.

Figure 19:
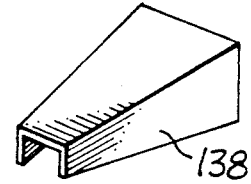
FIG. 19 is an isometric view of a finished thermoformable plastic workpiece having vertical side walls.

Apparatus 132 is designed to solve a problem involved in forming and shaping workpieces having vertical (right-angle) flanges or side walls such as finished workpiece 138 shown in FIG. 19. In forming such components, the problem arises of maintaining sufficient side pressure to react against the vertical flanges or side walls while the workpiece is cooling down in the cold dies of the forming apparatus.

Apparatus 132 solves this problem by having a flexible head 134, such as either a hydroform head or a hydropress head, instead of an upper cold die above the workpiece. An example of a hydroform head is shown in cross section in FIG. 24 and a hydropress head is shown in cross section in FIG. 25. A hydropress head or hydroform head maintains the workpiece in the desired final shape, it seals off the pressure media from above, and it provides side pressure against the vertical flanges or side walls. In those flange or side wall areas, the flexible head deforms to the shape of the lower cold die below as pressure is applied. This provides side pressure to react against the vertical flanges or side walls. A flexible head like flexible head 134 may also be employed in like manner in apparatus 20 (FIGS. 1 and 2) and in apparatus 100 (FIGS. 15 and 16).

In FIGS. 17 and 18, upper hot die 140 and flexible head 134 are mounted on the lower face of platen 22. A layer of insulation 102 separates platen 22 from die 140 and flexible head 134. Another layer of insulation 104 separates die 140 and flexible head 134 from each other. Flexible head 134 is usually at ambient temperature, but may be heated to the necessary elevated temperature when processing thermosetting materials or materials like TORLON and the AVIMID K series.

Lower hot die 144 and lower cold die 146 are mounted on base member 82b. A layer of insulation 106 separates base member 82b from dies 144 and 146. Another layer of insulation 108 separates dies 150 and 176 from each other.

Located on the front side of apparatus 132 is a first positioning frame 148 having a horizontal member 150 and two vertical T-shaped positioning posts 152 and 154. Horizontal member 150 slides back and forth on top of base member 82b. Each of the four adjustable suspension arms 116a, 116b, 116c, and 116d have one end attached to one of the vertical posts 152 or 154 and the other end attached to suspension tray 156. A second positioning frame 158 of like design having a horizontal member and two vertical T-shaped positioning posts is located on the rear side of apparatus 132. Four more adjustable suspension arms of like design have one end attached to one of the vertical positioning posts of positioning frame 158 and the other end attached to suspension tray 156.

Positioning frame 148 is moved back and forth in a horizontal plane by rod 130 which is connected through a linkage to horizontal member 150. Rod 130 is driven by a conventional double-acting cylinder 129 mounted on the front side of base member 82b. A second cylinder and rod combination of identical design is mounted on the rear side of base member 82b to move positioning frame 158 back and forth in a horizontal plane in tandem with positioning frame 148 so that suspension tray 156 is maintained in correct alignment with the dies. Alternatively, the cylinders can be mounted on the factory floor or some other non-moving structure. The positioning frames can also be designed as one piece tied together with cross members, and in that event, one cylinder could be employed instead of two.

It is preferred that suspension tray 156 have three work stations 164, 166, and 168 as shown in FIGS. 17 and 18. However, a suspension tray consisting of a single work station or two work stations can be employed if desired. In the preferred embodiment as shown in FIG. 18, a real workpiece 170 is placed on the second work station 166 and dummy workpieces 172 and 174 are placed in the first and third work stations 164 and 168, respectively. In FIG. 18, real workpiece 170 is a flat sheet made of thermoformable material (a raw workpiece). It is shown in a sloping position laid on top of suspension tray 156 at second work station 166. The dummy workpieces prevent the undesirable situation of uneven loading of the press. When the real workpiece 170 is being pressed by either hot dies 140 and 144 or cold die 146 and flexible head 134, there is a dummy workpiece of equal thickness being pressed by the other pair of dies.

FIG. 18 also shows that when the press in the open position suspension tray 156 is held by the suspension arms at a level that gives clearance above the highest portions of lower dies 144 and 146 so that suspension tray 156 can move freely back and forth in a horizontal plane without bumping the lower dies. In other respects, the construction and operation of apparatus 132 is similar to apparatus 100 (FIGS. 15 and 16) described earlier.

Figure 20:
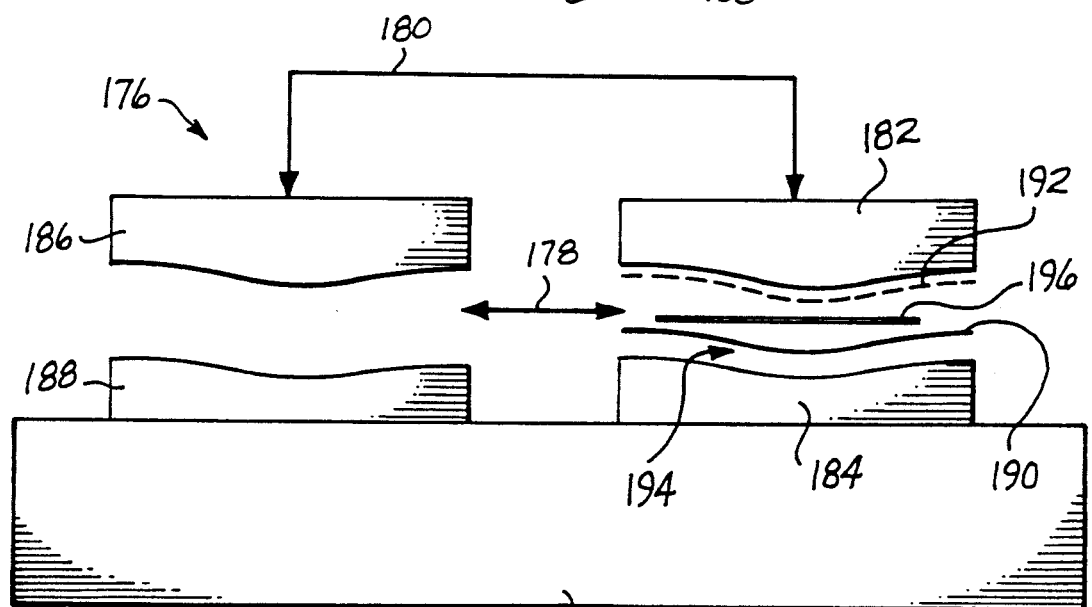
FIG. 20 is a schematic drawing of a front elevational view of another embodiment of a hot/cold press forming apparatus constructed according to the principles of the invention.

FIG. 20 shows, in schematic form, another embodiment of a hot/cold press forming apparatus 176. Apparatus 176 is a modified version of apparatus 100 (FIGS. 15 and 16) and it has certain components that are the same as in apparatus 100. Components of the two embodiments having like design and construction have been given the same reference numerals in the drawings. In this embodiment, the dies are horizontally stationary and the suspension tray and workpieces are moved horizontally from one pair of dies to the other pair of dies as shown by arrows 178. To prevent uneven loading of the press during the press closing motion shown by arrows 180, it is preferred to have a dummy workpiece move into position in the unused pair of dies at the same time that the real workpiece moves into position in the pair of dies being used.

Apparatus 176 is designed for forming and shaping gently contoured components made of thermoformable material. An example of a gently contoured component is an airplane fairing. Accordingly, upper hot die 182 and lower hot die 184 and upper cold die 186 and lower cold die 188 are gently contoured in the shape of the desired final workpiece. The suspension tray 190 and the optional cover sheet 192 (shown in phantom) have the same gently contoured shape.

In the preferred configuration, suspension tray 190 is supported and moved by a positioning frame and actuating mechanism like those shown in FIGS. 15 and 16. As in FIGS. 15 and 16, the positioning frame and actuating mechanism move suspension tray 190 from between hot dies 182 and 184 to between cold dies 186 and 188 as shown by left arrow 178.

Like the suspension tray shown in FIGS. 15 and 16, the preferred form of suspension tray 190 has three work stations. Only center work station 194 which supports real workpiece 196 is shown schematically in FIG. 20. However, a suspension tray consisting of a single work station or two work stations can be employed if desired.

Optional cover sheet 192 is attached to upper hot die 182 or to suspension tray 190 in such a way that it is released from upper hot die 182 or suspension tray 190 when the press is closed. For example, cover sheet 192 can be attached to upper hot die 182 by latches which open when the press is closed or cover sheet 192 can be detachably supported above suspension tray 190 by springs. Cover sheet 190 then moves across to the cold dies with workpiece 196 and suspension tray 190.

Cover sheet 192 in most cases would be reusable. If necessary, cover sheet 192 and suspension tray 190 may be made of a ductile material to make up for any die mismatch or nonuniformity in material thickness. The cover sheet and suspension tray materials help to slow and/or control cooling.

Figure 21:
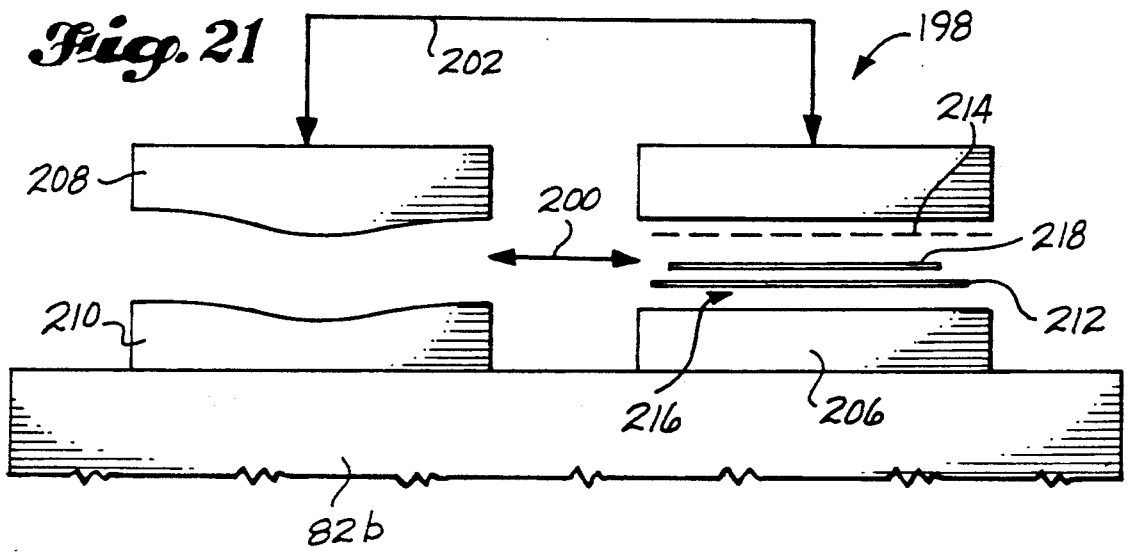
FIG. 21 is a schematic drawing of a front elevational view of another embodiment of a hot/cold press forming apparatus constructed according to the principles of the invention.

FIG. 21 shows, in schematic form, another embodiment of a hot/cold press forming apparatus 198. Apparatus 198 is a modified version of apparatus 176 (FIG. 20). Components of the two embodiments having like design and construction have been given the same reference numerals in the drawings. In this embodiment, the dies are horizontally stationary and the suspension tray and workpieces are moved horizontally from one pair of dies to the other pair of dies as shown by arrows 200. To prevent uneven loading of the press during the press closing motion shown by arrows 202, it is preferred to have a dummy workpiece move into position in the unused pair of dies at the same time that the real workpiece moves into position in the pair of dies being used.

Apparatus 198 is designed for forming and shaping gently contoured components made of thermoformable material. Apparatus 198 is different from apparatus 176 (FIG. 20) in that the heating dies (upper hot die 204 and lower hot die 206) are flat whereas the cooling dies (upper cold die 208 and lower cold die 210) are gently contoured in the shape of the desired final workpiece. Another difference from apparatus 176 is that, in the forming process carried out by apparatus 198, suspension tray 212 and optional cover sheet 214 are formed with workpiece 218.

In the preferred configuration, suspension tray 212 is supported and moved by a positioning frame and actuating mechanism like those shown in FIGS. 15 and 16. As in FIGS. 15 and 16, the positioning frame and actuating mechanism move suspension tray 212 from between hot dies 204 and 206 to between cold dies 208 and 210 as shown by left arrow 200.

Like the suspension tray shown in FIGS. 15 and 16, the preferred form of suspension tray 212 has three work stations. Only the center work station 216 which supports the real workpiece 218 is shown schematically in FIG. 21. However, a suspension tray consisting of a single work station or two work stations can be employed if desired.

An elastomeric (rubber-like) material may be used to make suspension tray. Such a suspension tray can be reused several times. Using a rubber-like material for the suspension tray and for the optional cover sheet is beneficial because it makes up for small mismatches in the tooling and applies even pressure to the workpiece. An elastomeric material may also be used to make the suspension tray in all of the other embodiments described herein.

Alternatively, a film material such as KAPTON (sold by E. I. du Pont de Nemours and Company) or nylon can be used as the suspension tray in all of the embodiments for thermoformable plastic materials described herein and as the optional cover sheet. The film material can be reused or discarded after each workpiece is formed. If the same material is used for the cover sheet and for the suspension tray, this is beneficial because it helps control cooling by cooling the workpiece equally from both sides.

Many aircraft components require conductive metal coatings, layers, or surface materials such as copper foil, copper mesh, copper knitted wire, aluminum foil, aluminum mesh, or flame spray deposition metal plating. These metal materials are used to dissipate electrical charge buildup, to protect against electromagnetic impulses (EMI shielding), or to diffuse the current of a lightning strike. In all of the embodiments for thermoformable plastic materials described herein, a conductive metal material (such as copper foil, copper mesh, aluminum foil, or aluminum mesh) can be used as the suspension tray or laid on top of the suspension tray and the conductive metal material then becomes molded integrally into the workpiece as the workpiece goes through the press cycle. Alternatively, the conductive metal material can be laid on top of the workpiece as a cover sheet and the conductive metal material then becomes molded into the workpiece as the workpiece goes through the press cycle.

Thus, a layer of conductive metal material can be either laid on top of the workpiece or the suspension tray or the metal material can be used as the suspension tray. This method of integrally molding a conductive metal material into the workpiece can be employed in the embodiments shown in FIGS. 20 and 21.

Figure 22:
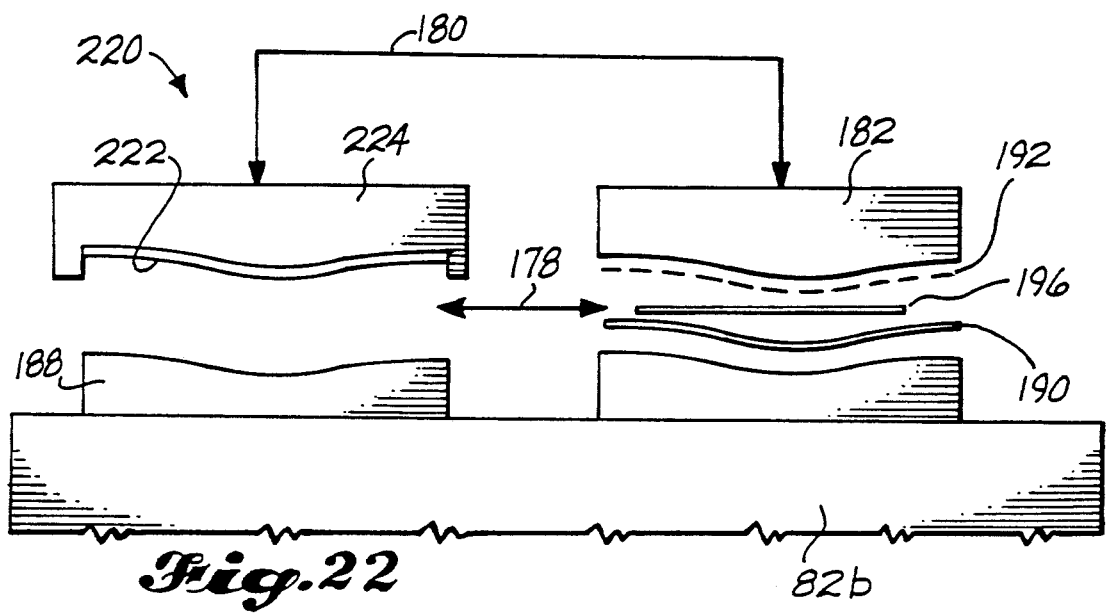
FIG. 22 is a schematic drawing of a front elevational view of another embodiment of a hot/cold press forming apparatus constructed according to the principles of the invention.

FIG. 22 shows, in schematic form, another embodiment of a hot/cold press forming apparatus 220 for gently contoured components made of thermoformable material. Apparatus 220 is a modified version of apparatus 176 shown in FIG. 20 and it has certain components that are the same as in apparatus 176. Components of the two embodiments having like design and construction have been given the same reference numerals in the drawings. In this embodiment, a thin flexible pressure pad 222 is placed on the lower face of upper cold die 224. Pressure pad 222 can be constructed in a variety of ways. It can be a bladder filled with oil, air, or a variety of fluids. Another material developed by United Technologies Corporation for its THERM-X process is a solid that turns to fluid and flows relatively easily when placed under pressure. This material can be used inside a bladder or similar pressure head. In some applications, a thin piece of elastomeric (rubber-like) material can be employed as pressure pad 222. Apparatus 220 makes it easy to apply even pressure to a workpiece. Thus, matched die tooling expenses and difficulties in achieving proper tolerances to apply even pressure are avoided by this embodiment.

Figure 23:
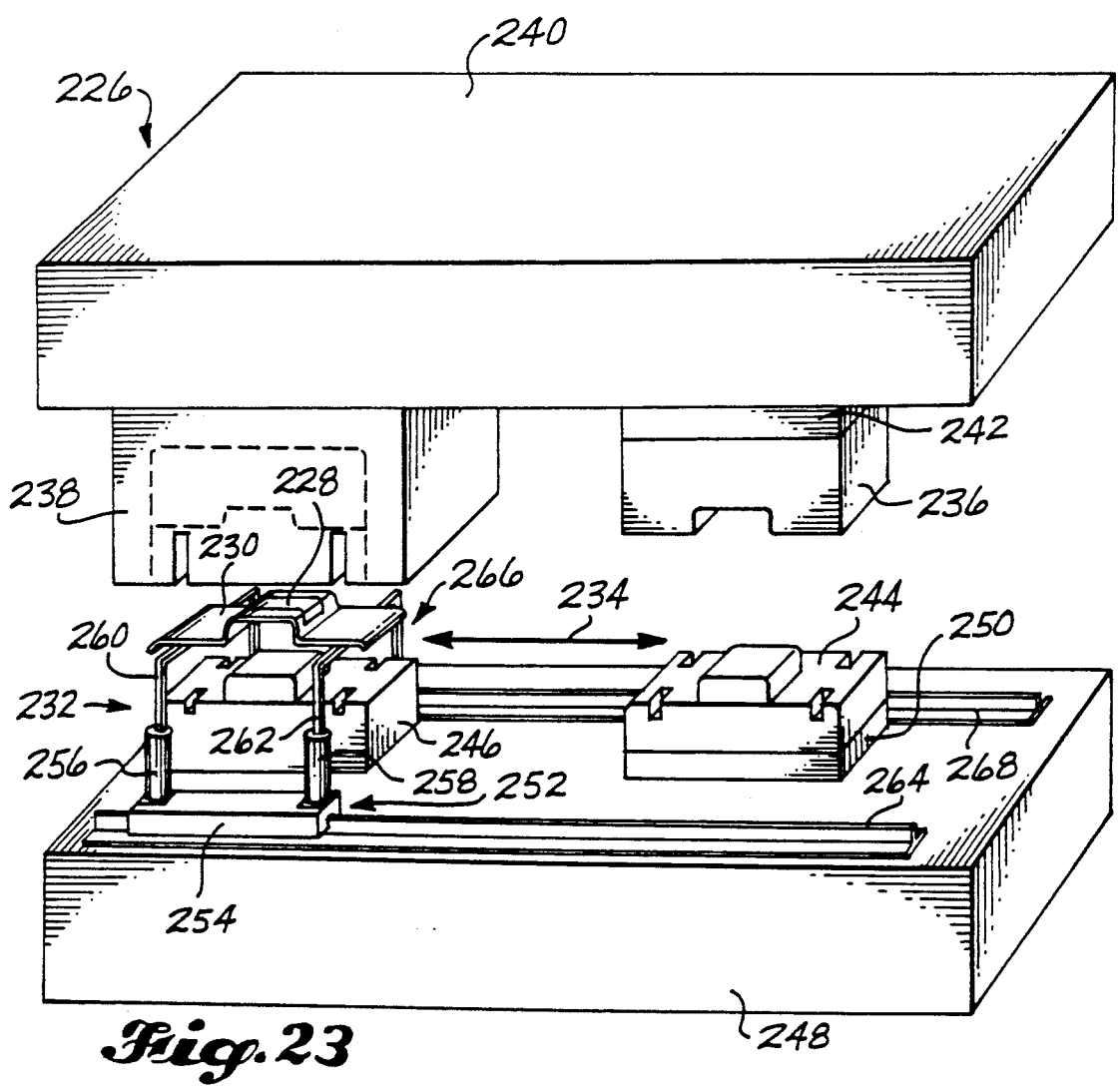
FIG. 23 is an isometric view of another embodiment of a hot/cold press forming apparatus constructed according to the principles of the invention.

FIG. 23 shows another embodiment of a hot/cold press forming apparatus 226 for forming complex-shaped components such as workpiece 228. In this embodiment, the dies are horizontally stationary and suspension tray 230 and workpiece 228 are moved horizontally by shuttle mechanism 232 from one pair of dies to the other pair of dies as shown by arrows 234. Upper hot die 236 and upper cold die 238 are mounted on the lower face of press platen 240. A layer of insulation 242 separates press platen 240 from upper hot die 236. Lower hot die 244 and lower cold die 246 are mounted on base member 248. A layer of insulation 250 separates base member 248 from lower hot die 244.

Shuttle mechanism 232 consists of a first positioning assembly 252 having a horizontal member 254 and two vertical cylinders 256 and 258 mounted thereon. Cylinders 256 and 258 are spring-loaded so that support arms 260 and 262 recess into the cylinders as press platen 240 comes down. Horizontal member 254 slides on track 264 mounted on top of base member 248. Support arms 260 and 262 have an inverted L-shape. The horizontal ends of support arms 260 and 262 fit into the recesses shown in the top of lower hot die 244 and lower cold die 246 when press platen 240 is in the closed position.

A second positioning assembly 266 having a horizontal member and two vertical cylinders of like design and construction are located on the rear side of apparatus 226. Second positioning assembly 266 moves horizontally on track 268 in parallel with first positioning assembly 252.

Figure 24:
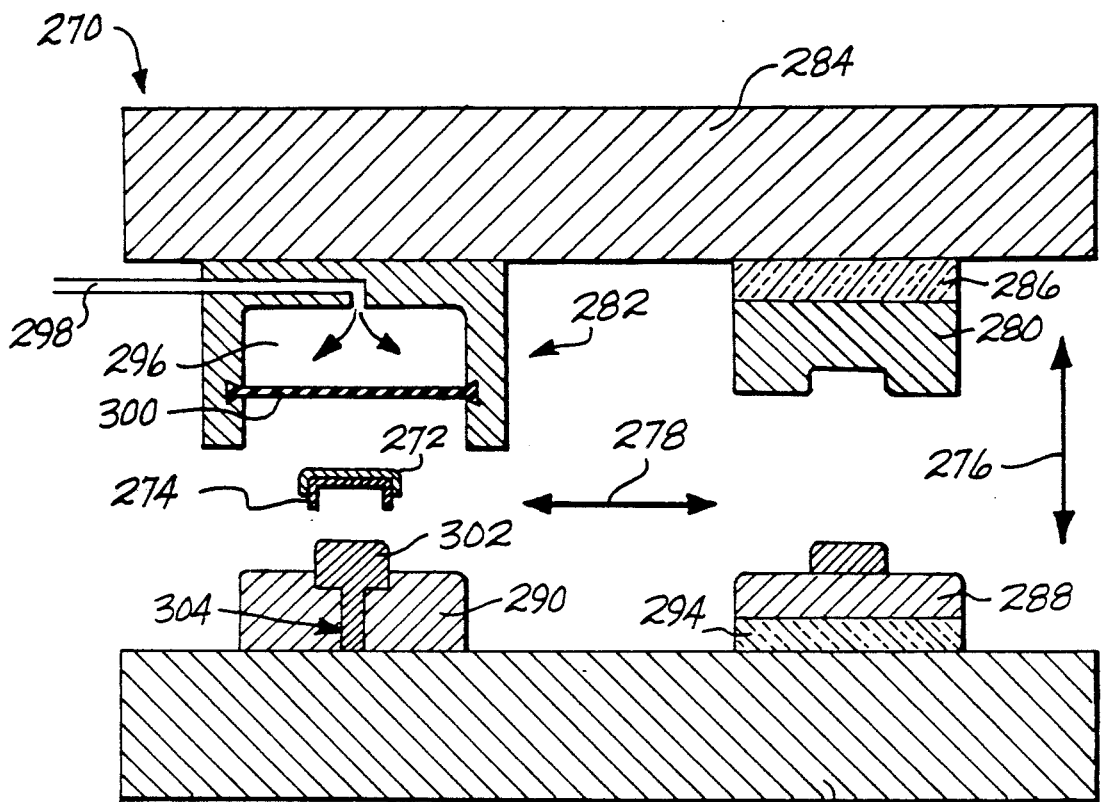
FIG. 24 is a vertical sectional view of another embodiment of a hot/cold press forming apparatus constructed according to the principles of the invention.

FIG. 24 shows, in vertical section, another embodiment of a hot/cold press forming apparatus 270 for forming complex-shaped components such as workpiece 272. In this embodiment, the dies are horizontally stationary and suspension tray 274 and workpiece 272 are moved horizontally by a shuttle mechanism from one pair of dies to the other pair of dies as shown by arrows 278. A shuttle mechanism having the same design and construction as shuttle mechanism 232 shown in FIG. 23 is employed in apparatus 270 but it is omitted for clarity in FIG. 24. An optional cover sheet that may be laid over workpiece 272 has also been omitted for clarity in FIG. 24.

Upper hot die 280 and upper forming unit 282 are mounted on the lower face of press platen 284. The press motion is shown by arrows 276. A layer of insulation 286 separates press platen 284 from upper hot die 280. Lower hot die 288 and lower cold die 290 are mounted on base member 292. A layer of insulation 294 separates base member 292 from lower hot die 288.

In apparatus 270, upper forming unit 282 is a hydroform head. The hydroform head consists of a chamber 296 into which a fluid (such as oil) is pumped under pressure through line 298 when press platen 284 is in the closed position. The side walls of chamber 296 contain the fluid and force it against flexible bladder 300 which expands against workpiece 272. The fluid can be heated to the necessary elevated temperature when processing thermosetting materials or materials like TORLON. Workpiece 272 is pressed against suspension tray 274 which is pressed against tool 302 in the center of lower cold die 290. If desired, tool 302 can be pushed vertically by optional ram cylinder 304.

If desired, a pair of flat heating dies like the flat heating dies 204 and 206 in apparatus 198 (FIG. 21) can be employed in apparatus 270.

Figure 25:
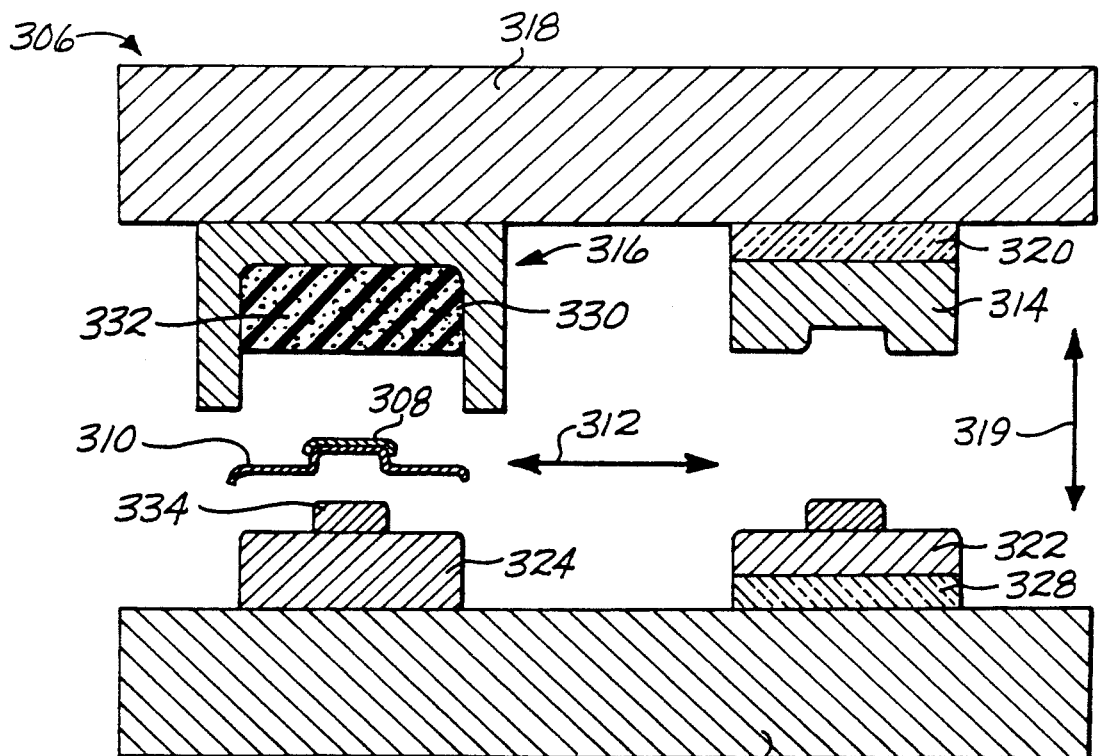
FIG. 25 is a vertical sectional view of another embodiment of a hot/cold press forming apparatus constructed according to the principles of the invention.

FIG. 25 shows, in vertical section, another embodiment of a hot/cold press forming apparatus 306 for forming complex-shaped components such as workpiece 308. In this embodiment, the dies are horizontally stationary and suspension tray 310 and workpiece 308 are moved horizontally by a shuttle mechanism from one pair of dies to the other pair of dies as shown by arrows 312. A shuttle mechanism having the same design and construction as shuttle mechanism 232 shown in FIG. 23 is employed in apparatus 306 but it is omitted for clarity in FIG. 25. An optional cover sheet that may be laid over workpiece 308 has also been omitted for clarity in FIG. 25.

Upper hot die 314 and upper forming unit 316 are mounted on the lower face of press platen 318. The press motion is shown by arrows 319. A layer of insulation 320 separates press platen 318 from upper hot die 314. Lower hot die 322 and lower cold die 324 are mounted on base member 326. A layer of insulation 328 separates base member 326 from lower hot die 322.

In apparatus 306, upper forming unit 316 is a hydropress head. The hydropress head consists of a chamber 330 which is filled with an elastomeric (rubber-like) material 322. The side walls of chamber 330 contain elastomeric material 332 and force it against workpiece 308. Workpiece 308 is pressed against suspension tray 310 which is pressed against tool 334 in the center of lower cold die 324.

If desired, a pair of flat heating dies like the flat heating dies 204 and 206 in apparatus 198 (FIG. 21) can be employed in apparatus 306.

Figure 26:
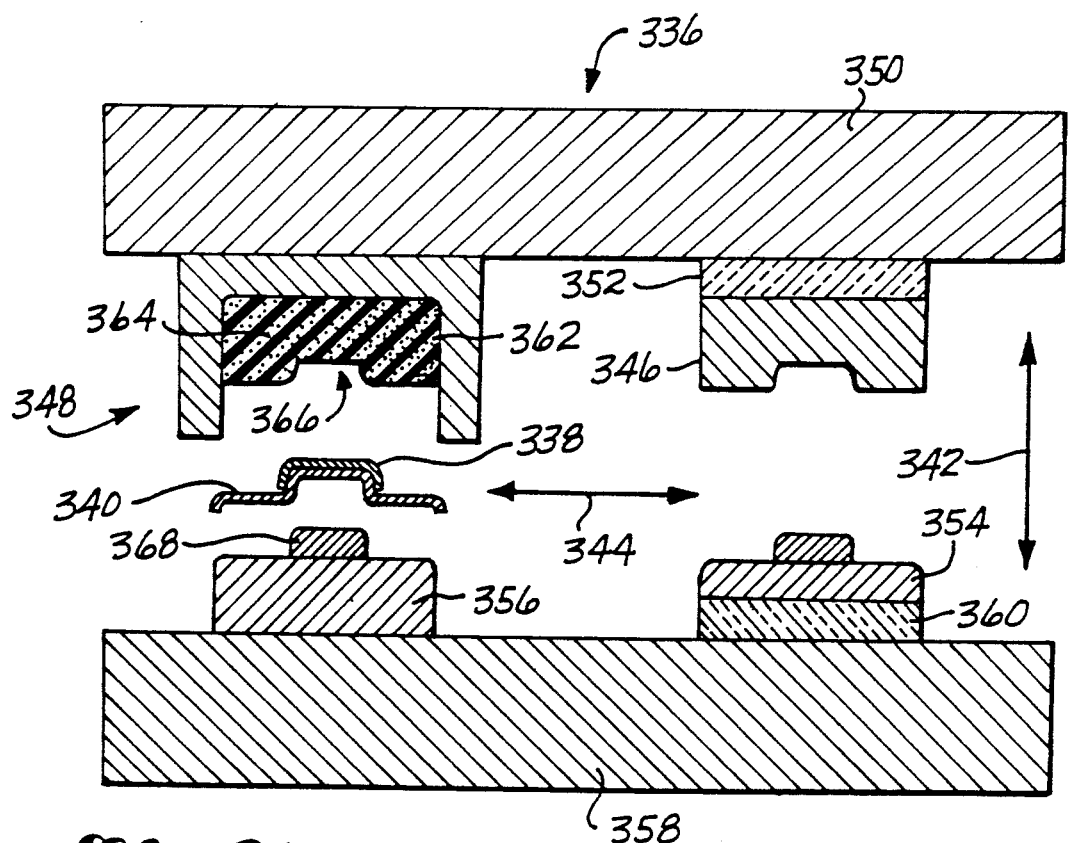
FIG. 26 is a vertical sectional view of another embodiment of a hot/cold press forming apparatus constructed according to the principles of the invention.

FIG. 26 shows, in vertical section, another embodiment of a hot/cold press forming apparatus 336 for forming complex-shaped components such as workpiece 338. In this embodiment, the dies are horizontally stationary and suspension tray 340 and workpiece 338 are moved horizontally by a shuttle mechanism from one pair of dies to the other pair of dies as shown by arrows 344. A shuttle mechanism having the same design and construction as shuttle mechanism 232 shown in FIG. 23 is employed in apparatus 336 but it is omitted for clarity in FIG. 26. An optional cover sheet that may be laid over workpiece 338 also has been omitted from FIG. 26 for clarity.

Upper hot die 346 and upper forming unit 348 are mounted on the lower face of press platen 350. The press motion is shown by arrows 342. A layer of insulation 352 separates press platen 350 from upper hot die 346. Lower hot die 354 and lower cold die 356 are mounted on base member 358. A layer of insulation 360 separates base member 358 from lower hot die 354.

In apparatus 336, upper forming unit 348 is a modified hydropress head. The modified hydropress head consists of a chamber 362 which is filled with an elastomeric (rubber-like) material 364 which is machined or cast with a recessed portion 366 in the desired shape of the final component. The side walls of chamber 362 contain elastomeric material 364 and force it against workpiece 338. Workpiece 338 is pressed against suspension tray 340 which is pressed against tool 368 in the center of lower cold die 356.

If desired, a pair of flat heating dies like the flat heating dies 204 and 206 in apparatus 198 (FIG. 21) can be employed in apparatus 336. A cover sheet may also be used with the flat heating dies.

As will be apparent to those skilled in the art to which the invention is addressed, the present invention may be embodied in forms other than those specifically disclosed above, without departing from the spirit or essential characteristics of the invention. The particular embodiments of apparatus described above and the particular details of the processes described are therefore to be considered in all respects as illustrative and not restrictive. The scope of the present invention is as set forth in the appended claims rather than being limited to the examples of apparatus and processes set forth in the foregoing description. Any and all equivalents are intended to be embraced by the claims.

What is claimed is:

1. A method of forming and shaping a workpiece made of thermoformable material using a first pair of forming means at a first temperature and a second pair of forming means at a second temperature, which comprise the steps of:
   (a) providing a tray means suspended in midair by suspension means;
   (b) loading said workpiece made of thermoformable material on said tray means suspended in midair;
   (c) moving said first pair of forming means horizontally into position above said workpiece and below said tray means;
   (d) closing said first pair of forming mean against said workpiece and said tray means to heat said workpiece and to form and shape said workpiece into a formed workpiece of desired configuration;
   (e) opening said first pair of forming means and moving said first pair of forming means horizontally away from said formed workpiece and said tray means;
   (f) moving said second pair of forming means horizontally into position above said formed workpiece and below said tray means;
   (g) closing said second pair of forming means against said formed workpiece and said tray means to cool said formed workpiece while maintaining said formed workpiece in the desired configuration; and
   (h) opening said second pair of forming means and unloading said formed and cooled workpiece.

2. The method of claim 1 wherein the thermoformable material is a thermoplastic material.

3. The method of claim 2 wherein the thermoplastic material is selected from the group consisting of polyetheretherketone, polyphenylene sulfide, polyetherimide, polyamideimide, polyethersulfone, polyimide, and polypropylene.

4. The method of claim 1 wherein the thermoformable material is a thermosetting material.

5. The method of claim 1 wherein the thermoformable material is a metal material.

6. The method of claim 1 wherein the first pair of forming means is at a temperature of about 750° F. and the second pair of forming means is at a temperature below about 290° F.

7. The method of claim 1 wherein the first pair of forming means is at a temperature of about 650° F. and the second pair of forming means is at a temperature below about 180° F.

8. The method of claim 1 wherein a cover sheet is placed on top of the workpiece.

9. The method of claim 1 wherein one of the forming means of the second pair of forming means is a flexible head means.

10. The method of claim 9 wherein the flexible head means is selected from the group consisting of a hydroform head, a hydropress head, and a modified hydropress head.

11. The method of claim 1 wherein the tray means is made of an elastomeric material.

12. The method of claim 1 wherein the tray means is made of a film material.

13. The method of claim 1 wherein a conductive metal material is used either as the tray means or as a cover sheet laid on top of the tray means, and the conductive metal material becomes molded into the workpiece 14. The method of claim 1 wherein a conductive metal material is used as a cover sheet laid on top of the workpiece and the conductive metal material becomes molded into the workpiece.

15. A method of forming and shaping a workpiece made of thermoformable material using a first pair of forming means at a first temperature and a second pair of forming means at a second temperature, which comprises the steps of:
   (a) providing a tray means suspended in midair by suspension means;
   (b) loading said workpiece made of thermoformable material on said tray means suspended in midair;
   (c) moving said workpiece and said tray means into position between said first pair of forming means;
   (d) closing said first pair of forming means against said workpiece and said tray means to heat said workpiece and to form and shape said workpiece into a formed workpiece of desired configuration;
   (e) opening said first pair of forming means and moving said formed workpiece and said tray means away from said first pair of forming means;
   (f) moving said formed workpiece and said tray means into position between said second pair of forming means;
   (g) closing said second pair of forming means against said formed workpiece and said tray means to cool said formed workpiece while maintaining said formed workpiece in the desired configuration; and
   (h) opening said second pair of forming means and unloading said formed and cooled workpiece.

16. The method of claim 15 wherein the thermoformable material is a thermoplastic material.

17. The method of claim 16 wherein the thermoplastic material is selected from the group consisting of polyetheretherketone, polyphenylene sulfide, polyetherimide, polyamideimide, polyethersulfone, polyimide, and polypropylene.

18. The method of claim 15 wherein the first pair of forming means is at a temperature of about 750° F. and the second pair of forming means is at a temperature below of about 290° F.

19. The method of claim 15 wherein the first pair of forming means is at a temperature of about 650° F. and the second pair of forming means is at a temperature below about 180° F.

20. The method of claim 15 wherein a cover sheet is placed on top of the workpiece.

21. The method of claim 15 wherein one of the forming means of the second pair of forming means is a flexible head means.

22. The method of claim 21 wherein the flexible head means is selected from the group consisting of a hydroform head, a hydropress head, and a modified hydropress head.

23. The method of claim 15 wherein the tray means has a plurality of work stations with a real workpiece supported at one of the work stations and with dummy workpieces supported at the other work stations.

24. The method of claim 15 wherein the tray means is made of an elastomeric material.

25. The method of claim 15 wherein the tray means is made of a film material.

26. The method of claim 15 wherein a conductive metal material is used either as the tray means or as a cover sheet laid on top of the tray means, and the conductive metal material becomes molded into the workpiece.

27. The method of claim 15 wherein a conductive metal material is used as a cover sheet laid on top of the workpiece and the conductive metal material becomes molded into the workpiece.

28. The method of claim 15 wherein one of the forming means of the second pair of forming means includes a flexible pressure pad placed on the face of the forming means.

29. The method of claim 15 wherein one of the forming means of the second pair of forming means includes a tool which is moved by a ram cylinder.

30. A method of producing a finished workpiece by forming and shaping a workpiece made of thermoformable plastic material using a first pair of forming means at a first temperature and a second pair of forming means at a second temperature, which comprises the steps of:
(a) providing a tray means suspended in midair by suspension means;
(b) loading and workpiece made of thermoformable plastic material on said tray means suspended in midair;
(c) moving said first pair of forming means horizontally into position above said workpiece and below tray means;
(d) closing said first pair of forming means against said workpiece and said tray means to heat said workpiece to an intermediate temperature and to form and shape said workpiece into a formed workpiece of desired configuration;
(e) opening said first pair of forming means and moving said first pair of forming means horizontally away from said formed workpiece and said tray means;
(f) moving said second pair of forming means horizontally into position above said formed workpiece and below said tray means;
(g) closing said second pair of forming means against said formed workpiece and said tray means to heat said formed workpiece to a higher temperature while maintaining the formed workpiece in the desired configuration thereby forming said finished workpiece; and
(h) opening said second pair of forming means and unloading said finished workpiece.

31. The method of claim 30 wherein the thermoformable plastic material is a thermosetting material.

32. The method of claim 30 wherein the thermoformable plastic material contains polyimide.

33. The method of claim 30 wherein the thermoformable plastic material contains polyamideimide.

34. The method of claim 30 wherein the first pair of forming means is at a temperature of about 430° F. and the second pair of forming means is at a temperature of about 560°-580° F.

35. The method of claim 30 wherein the first pair of forming means is at a temperature of about 430° F. and the second pair of forming means is at a temperature of about 700°-750° F.

36. The method of claim 30 wherein a cover sheet is placed on top of the workpiece.

37. The method of claim 30 wherein one of the forming means of the second pair of forming means is a flexible head means.

38. The method of claim 37 wherein the flexible head means is selected from the group consisting of a hydroform head, a hydropress head, and a modified hydropress head.

39. The method of claim 30 wherein the tray means is made of an elastomeric material.

40. The method of claim 30 wherein the tray means is made of a film material.

41. The method of claim 30 wherein a conductive metal material is used either as the tray means or as a cover sheet laid on top of the tray means, and the conductive metal material becomes molded into the workpiece.

42. The method of claim 30 wherein a conductive metal material is used as a cover sheet laid on top of the workpiece and the conductive metal material becomes molded into the workpiece.

43. A method of producing a finished workpiece by forming and shaping a workpiece made of thermoformable plastic material using a first pair of forming means at a first temperature and a second pair of forming means at a second temperature, which comprises the steps of:
(a) providing a tray means suspended in midair by suspension means;
(b) loading said workpiece made of thermoformable plastic material on said tray means suspended in midair;
(c) moving said workpiece and said tray means into position between said first pair of forming means;
(d) closing said first pair of forming means against said workpiece and said tray means to heat said workpiece to an intermediate temperature and to form and shape said workpiece into a formed workpiece of desired configuration;
(e) opening said first pair of forming means and moving said formed workpiece and said tray means away from said first pair of forming means;
(f) moving said formed workpiece and said tray means into position between said second pair of forming means;
(g) closing said second pair of forming means against said formed workpiece and said tray means to heat said formed workpiece to a higher temperature while maintaining said formed workpiece in the desired configuration thereby forming said finished workpiece; and
(h) opening said second pair of forming means and unloading said finished workpiece.

44. The method of claim 43 wherein the thermoformable plastic material is a thermosetting material.

45. The method of claim 43 wherein the thermoformable plastic material contains polyimide.

46. The method of claim 43 wherein the thermoformable plastic material contains polyamideimide.

47. The method of claim 43 wherein the first pair of forming means is at a temperature of about 430° F. and the second pair of forming means is at a temperature of about 560°-580° F.

48. The method of claim 43 wherein the first pair of forming means is at a temperature of about 430° F. and the second pair of forming means is at a temperature of about 700°-750° F.

49. The method of claim 43 wherein a cover sheet is placed on top of the workpiece.

50. The method of claim 43 wherein one of the forming means of the second pair of forming means is a flexible head means.

51. The method of claim 50 wherein the flexible head means is selected from the group consisting of a hydroform head, a hydropress head, and a modified hydropress head.

52. The method of claim 43 wherein the tray means is made of an elastomeric material.

53. The method of claim 43 wherein the tray means is made of a film material.

54. The method of claim 43 wherein a conductive metal material is used either as the tray means or as a cover sheet laid on top of the tray means, and the conductive metal material becomes molded into the workpiece.

55. The method of claim 43 wherein a conductive metal material is used as a cover sheet laid on top of the workpiece and the conductive metal material becomes molded into the workpiece.

* * * * *